(12) United States Patent
Chopade et al.

(10) Patent No.: US 9,840,660 B2
(45) Date of Patent: Dec. 12, 2017

(54) CROSSLINKER-COATED PROPPANT PARTICULATES FOR USE IN TREATMENT FLUIDS COMPRISING GELLING AGENTS

(71) Applicant: Halliburton Energy Services, Inc., Houston, TX (US)

(72) Inventors: Prashant D. Chopade, Kingwood, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/105,265

(22) PCT Filed: Feb. 26, 2014

(86) PCT No.: PCT/US2014/018712
§ 371 (c)(1),
(2) Date: Jun. 16, 2016

(87) PCT Pub. No.: WO2015/130276
PCT Pub. Date: Sep. 3, 2015

(65) Prior Publication Data
US 2016/0319186 A1 Nov. 3, 2016

(51) Int. Cl.
*C09K 8/68* (2006.01)
*C09K 8/50* (2006.01)
(Continued)

(52) U.S. Cl.
CPC .............. *C09K 8/685* (2013.01); *C09K 8/508* (2013.01); *C09K 8/66* (2013.01); *C09K 8/805* (2013.01);
(Continued)

(58) Field of Classification Search
CPC . C09K 8/68; C09K 8/685; C09K 8/50; C09K 8/508; C09K 8/66; C09K 2208/22; C09K 2208/24; C09K 2208/26; E21B 43/26; E21B 43/267
See application file for complete search history.

(56) References Cited

U.S. PATENT DOCUMENTS 5,998,511 A 12/1999 Westland et al.
6,311,773 B1 11/2001 Todd et al.
(Continued)

FOREIGN PATENT DOCUMENTS

WO 2005085595 A1 9/2005
WO 2012104582 A1 8/2012
(Continued)

OTHER PUBLICATIONS

International Search Report and Written Opinion for PCT/US2014/018712 dated Nov. 25, 2014.

*Primary Examiner* — Zakiya W Bates
*Assistant Examiner* — Crystal J Miller
(74) *Attorney, Agent, or Firm* — McDermott Will & Emery LLP

(57) ABSTRACT

Methods including preparing a treatment fluid comprising an aqueous base fluid, a gelling agent, and crosslinker-coated particulates, wherein the crosslinker-coated particulates are formed by at least partially coating a particulate with a stabilizing agent, and at least partially coating the particulate with a first crosslinking agent atop the stabilizing agent, wherein the stabilizing agent imparts a hydrophobic nature to the particulate when the stabilizing agent is at least partially coated onto the particulate; introducing the treatment fluid into a subterranean formation, and reacting the first crosslinking agent with the gelling agent in the treatment fluid so as to crosslink the gelling agent and suspend the crosslinker-coated particulates.

18 Claims, 1 Drawing Sheet

(51) Int. Cl.
    *E21B 43/26*     (2006.01)
    *C09K 8/508*     (2006.01)
    *C09K 8/66*     (2006.01)
    *C09K 8/80*     (2006.01)
    *C09K 8/88*     (2006.01)
    *E21B 43/267*     (2006.01)

(52) U.S. Cl.
    CPC .............. C09K 8/887 (2013.01); E21B 43/26 (2013.01); E21B 43/267 (2013.01); *C09K 2208/22* (2013.01); *C09K 2208/24* (2013.01); *C09K 2208/26* (2013.01); *C09K 2208/28* (2013.01); *C09K 2208/32* (2013.01)

(56) References Cited

U.S. PATENT DOCUMENTS

| | | |
|---|---|---|
| 2003/0224165 A1* | 12/2003 | Anderson .............. C09K 8/805 428/403 |
| 2006/0151168 A1 | 7/2006 | Nguyen et al. |
| 2006/0201673 A1 | 9/2006 | Welton et al. |
| 2008/0011477 A1* | 1/2008 | Rediger .................. C09K 8/64 166/280.2 |
| 2010/0307749 A1* | 12/2010 | Nguyen ................ C09K 8/805 166/278 |
| 2012/0004148 A1 | 1/2012 | Ogle et al. |
| 2012/0024526 A1 | 2/2012 | Liang et al. |
| 2012/0073821 A1 | 3/2012 | Holtsclaw et al. |
| 2012/0227967 A1 | 9/2012 | Shaikh et al. |
| 2013/0233545 A1 | 9/2013 | Mahoney et al. |
| 2014/0000891 A1 | 1/2014 | Mahoney et al. |
| 2014/0014348 A1 | 1/2014 | Mahoney et al. |
| 2014/0318779 A1* | 10/2014 | Welton ................. E21B 43/267 166/280.2 |

FOREIGN PATENT DOCUMENTS

| | | |
|---|---|---|
| WO | 2013158306 A1 | 10/2013 |
| WO | 2013158308 A1 | 10/2013 |
| WO | 2015130276 A1 | 9/2015 |

\* cited by examiner

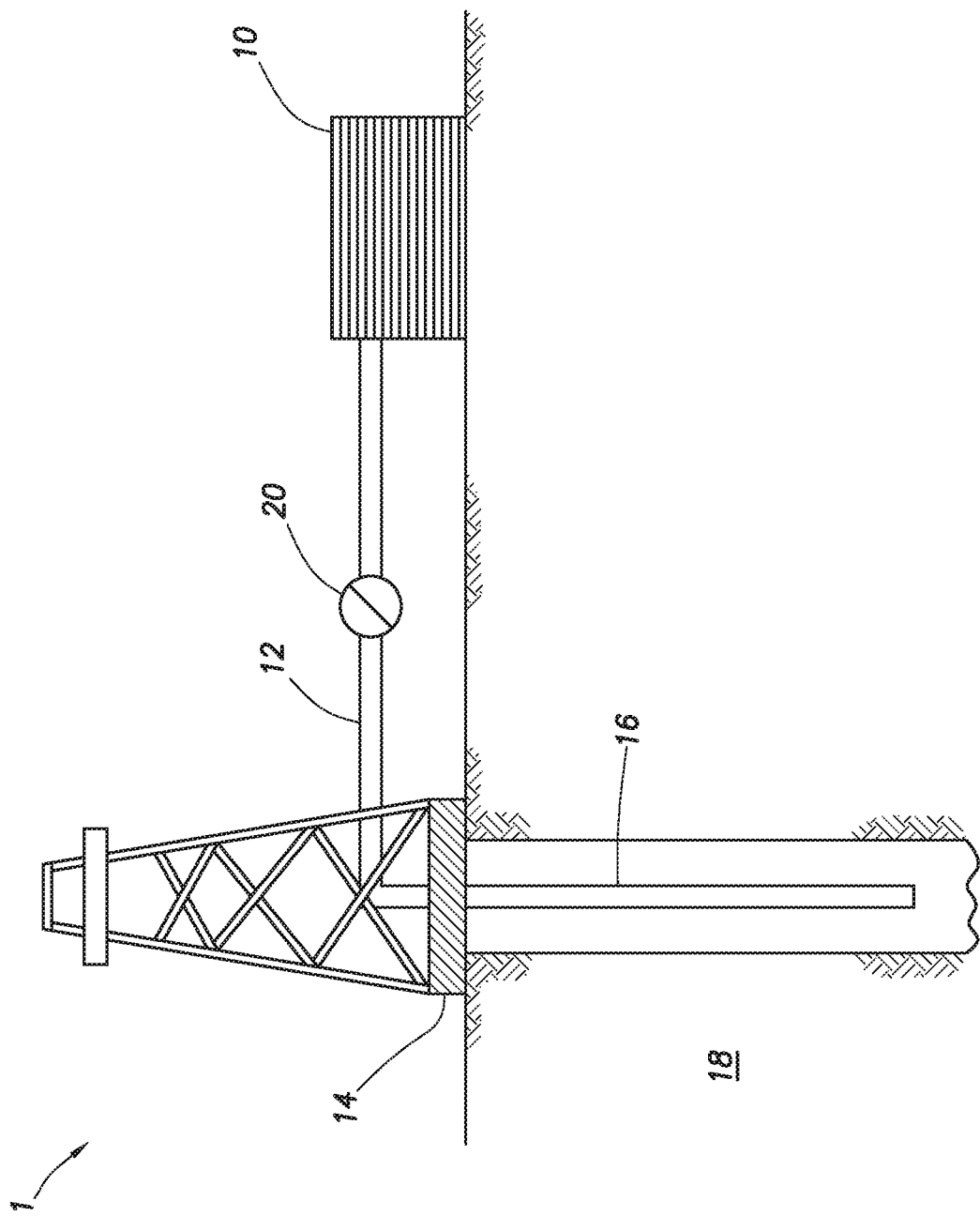

CROSSLINKER-COATED PROPPANT PARTICULATES FOR USE IN TREATMENT FLUIDS COMPRISING GELLING AGENTS

BACKGROUND

The embodiments herein relate generally to hydraulic fracturing operations and, more particularly, relate to crosslinker-coated particulates capable of suspending in treatment fluids comprising gelling agents.

Subterranean wells (e.g., hydrocarbon producing wells, water producing wells, and the like) are often stimulated by hydraulic fracturing treatments. In hydraulic fracturing treatments, a gelled treatment fluid is pumped into a portion of a subterranean formation at a rate and pressure such that the subterranean formation breaks down and one or more fractures are formed therein. Particulate solids, such as graded sand, are typically suspended in at least a portion of the treatment fluid and deposited into the fractures in the subterranean formation. These particulate solids, or "proppants particulates" (also referred to simply as "proppants") serve to prop the fracture open (e.g., keep the fracture from fully closing) after the hydraulic pressure is removed. By keeping the fracture from fully closing, the particulates aid in forming conductive paths through which produced fluids, such as hydrocarbons, may flow.

Hydraulic fracturing treatments may also be combined with sand control treatments, such as a gravel packing treatment. Such treatments may be referred to as "frac-packing" treatments. In a typical frac-packing treatment, a gelled treatment fluid comprising a plurality of particulates (e.g. is pumped through the annulus between a wellbore tubular mounted with a screen and a wellbore in a subterranean formation. The fluid is pumped into perforations through a casing, or directly into the wellbore in the case of open hole completions at a rate and pressure sufficient to create or enhance at least one fracture, and the particulates are deposited in the fracture and in the annulus between the screen and the wellbore. The particulates aid in propping open the fracture, as well as controlling the migration of formation fines or other loose particles in the formation from being produced with produced fluids.

The degree of success of a fracturing operation (both a traditional hydraulic fracturing operation and a frac-packing operation) depends, at least in part, upon fracture porosity and conductivity once the fracturing operation is complete and production is begun. Fracturing operations may place a volume of particulates into a fracture to form a "proppant pack" or "gravel pack" (referred to herein as "proppant pack") in order to ensure that the fracture does not close completely upon removing the hydraulic pressure. The ability of the particulates to maintain a fracture open depends upon the ability of the particulates to withstand fracture closure pressures. The porosity of a proppant pack within a fracture is related to the interconnected interstitial spaces between abutting particulates. Thus, the fracture productivity is closely related to the strength of the placed particulates and the interstitial spaces between the particulates in the proppant pack.

In some fracturing operations, a large volume of particulates may be placed within the fracture to form a tight proppant pack. In other fracturing operations, a much reduced volume of particulates may be placed in the fracture to create larger interstitial spaces between the individual particulates. However, both fracturing approaches may result in at least some settling of the particulates within a treatment fluid as the treatment fluid is introduced downhole or after placement in a fracture opening. Particulate settling may lead to a fracture or a top portion of a fracture closing, which may lower the conductivity of the proppant fracture and result in proppant masses having little or no interstitial spaces at the bottom portion of a fracture, thereby further decreasing the conductivity of the fracture. Proppant settling may be particularly problematic in cases where proppant aggregates are used in place of traditional proppant particulates because the proppant aggregates tend to be larger and may be heavier and, thus, more difficult to hold in suspension. While settling may be counteracted by using a high pump rate or by increasing the viscosity of the fluid carrying the proppant particulates or proppant aggregates, such methods often lose effectiveness once the fluid comprising the proppant or aggregates is placed into a fracture and before the hydraulic pressure is released.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate generally to hydraulic fracturing operations and, more particularly, relate to crosslinker-coated particulates capable of suspending in treatment fluids comprising gelling agents. The crosslinker-coated particulates described herein are capable of crosslinking gelling agents in a treatment fluid, thereby forming a gelled treatment fluid in the vicinity of the coated particulates. By forming the gelled treatment fluid, the crosslinker-coated particulates are held in suspension in the treatment fluid and their tendency to settle is reduced or eliminated during use of the treatment fluid in a subterranean formation operation, such as a hydraulic fracturing operation.

In some embodiments, the methods and compositions described herein may be with reference to a hydraulic fracturing operation (e.g., formation of a proppant pack). However, the crosslinker-coated particulates may be used in any other subterranean formation operation that may employ a treatment fluid comprising a gelling agent and that may benefit from having a suspended particulate. Such subterranean formation operations may include, but are not limited to, a drilling operation; a stimulation operation; an acidizing operation; an acid-fracturing operation; a sand control operation; a fracturing operation; a frac-packing operation; a remedial operation; a near-wellbore consolidation operation; and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a method comprising preparing a treatment fluid comprising an aqueous base fluid, a gelling agent, and crosslinker-coated particulates. The crosslinker-coated particulates are formed by providing a particulate. The particulate is first at least partially coated with a stabilizing agent, followed by at least partially coating the particulate with a crosslinking agent atop the stabilizing agent. One or more types of stabilizing agents may be at least partially coated onto the particulate. Similarly, one or more types of crosslinking agents may be at least partially coated onto the particulate atop the one or more types of stabilizing agent. The stabilizing agent is capable of imparting a hydrophobic nature to the particulate when the stabilizing agent is at least partially coated onto the particulate, such that the crosslinker-coated particulates therefore have a hydrophobic nature. The treatment fluid comprising the gelling agent and the crosslinker-coated particulates may be introduced into a subterranean formation and the crosslinking agent and gelling agent may react so as to crosslink the gelling agent and suspend the crosslinker-coated particulates. In some embodiments, the subterranean formation may comprise at least one fracture and the crosslinker-coated particulates may be placed within the at least one fracture to form a proppant pack therein.

The crosslinker-coated particulates may be stored and transported in the treatment fluids described herein to a work site or may be formed on-the-fly, as a particular operation may warrant. As used herein, the term "on-the-fly" refers to performing an operation during a subterranean treatment that does not require stopping normal operations. Generally, the embodiments of the present disclosure provide for ease of transport of the particulates to the well site, because the crosslinker-coated particulates may be stored alone or in the treatment fluid in which they will be introduced into the subterranean formation.

The stabilizing agent and the crosslinking agent may be at least partially coated onto the particulates by any means known to those of skill in the art. In some embodiments, the stabilizing agent and the crosslinking agent are at least partially coated onto the particulates by at least one of dry coating, wet coating, and any combination thereof. That is, both the stabilizing agent and the crosslinking agent may be coated onto the particulates by dry coating; the stabilizing agent and the crosslinking agent may be coated onto the particulates by wet coating; the stabilizing agent may be coated onto the particulates by dry coating and the crosslinking agent may be coated onto the particulates by wet coating; or the stabilizing agent may be coated onto the particulates by wet coating and the crosslinking agent may be coated onto the particulates by dry coating, without departing from the scope of the present disclosure. As used herein, the term "coating" refers to at least a partial coating of some or all of the particulates described herein and is not intended to refer solely to 100% coverage of the particulates.

The reaction between the gelling agent and the crosslinking agent causes the gelling agent to crosslink and viscosify the treatment fluid at or near the crosslinker-coated particulates, thereby facilitating their suspension in the treatment fluid. Among others, an advantage of the embodiments described in the present disclosure include a substantial reduction in the amount of gelling agent typically used for a subterranean formation operation in order to ensure that particulates are adequately suspended therein. In some embodiments, the amount of gelling agent for use in the embodiments described herein may be reduced by about 30% to about 50% as compared to the amount of gelling agent used in traditional treatment fluids for use in subterranean formation operations. Generally, the use of high amounts of gelling agent(s) in subterranean operations (e.g., fracturing operations) require higher breaker loadings, discussed in further detail below. These high amounts of gelling agent may generate increased "residue" in the formation, where the gelling agent remains in the formation, causing, for example, a reduction in conductivity of fractures in the formation, thereby lowering the hydrocarbon production. Because the embodiments described in the present disclosure permit lower amount of gelling agent to be used, less residue remains in the formation, thereby enhancing the conductivity and production of hydrocarbons therefrom. Moreover, the reduced amount of gelling agents allows reduction in the amount of breaker required. Furthermore, a substantially reduced amount of crosslinker may be required to prepare the crosslinker-coated particulates than may be necessary if simply adding the crosslinking agent directly to the treatment fluid, as is done in traditional operations. This reduction may be allowed because the crosslinking agents of the present disclosure are strategically placed on the particulates to be suspended, rather than being dispersed throughout a large volume of fluid, where they may encounter a gelling agent at a location lacking any particulates to suspend. Such substantial reduction in the amounts of gelling agent, breakers, and crosslinking agents may equate to dramatic cost savings for an operator.

The hydrophobic nature of the stabilizing agent coated at least partially onto the particulates to form the crosslinker-coated particulates described herein may impart a hydrophobic nature to the crosslinker-coated particulates. In some embodiments described herein, after reacting the crosslinking agent on the crosslinker-coated particulate and the gelling agent, the crosslinking agent may be dissociated from the particulate, thereby leaving the particulate at least partially coated with the stabilizing agent, the stabilizing agent imparting the hydrophobic nature to the particulate. Dissociation of the crosslinking agent and the crosslinked gelling agent associated with the crosslinking agent advantageously removes any gelling agent residue from the particulate, which can be detrimental to the conductivity of a propped fracture, for example, and therefore impair hydrocarbon recovery. In some embodiments, a breaker, which may be an immediate breaker or a delayed breaker, may break the crosslinked gelling agent in the treatment fluid. As used herein, the term "breaker" refers to any substance that is capable of decreasing the viscosity of a fluid (e.g., by breaking the crosslinks in a crosslinked gelling agent). The hydrophobic nature of the stabilizing agent remaining on the particulate may prevent interaction of the particulate and the broken treatment fluid.

The crosslinker-coated particulates described herein may be formed by at least partially coating a particulate with a stabilizing agent, followed by at least partially coating the particulate with a crosslinking agent atop the stabilizing agent. Suitable particulates for use in the embodiments herein for forming the crosslinker-coated particulates may be any particulate material capable of use in a subterranean formation and, in those embodiments where the crosslinker-coated particulates are used to prop open a fracture, any particulate material capable of withstanding fracture closure pressures in a particular subterranean formation. Suitable materials for particulates used in forming the crosslinker-coated particulates described herein may include, but are not limited to, sand, bauxite, ceramic materials, glass materials, polymer materials (e.g., ethylene vinyl acetate or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof.

Suitable particulates for use in the methods of the present disclosure for forming the crosslinker-coated particulates may be of any size and shape combination known in the art as suitable for use in a subterranean formation operation (e.g., a hydraulic fracturing operation). Generally, where the chosen particulate is substantially spherical, suitable particulates may have a size in the range of from a lower limit of about 2 mesh, 20 mesh, 40 mesh, 60 mesh, 70 mesh, 80 mesh, 100 mesh, 120 mesh, 140 mesh, 160 mesh, 180 mesh, and 200 mesh to an upper limit of about 400 mesh, 380 mesh, 360 mesh, 340 mesh, 320 mesh, 300 mesh, 280 mesh, 260 mesh, 240 mesh, 220 mesh, and 200 mesh, U.S. Sieve Series, and encompassing any value and any subset therebetween. In some embodiments, the particulates described herein may be smaller than 400 mesh (e.g., may be as small as about 4800 mesh, an estimated sieve size equaling about 2 microns, or even smaller). In some embodiments, the particulates may have a size in the range of from about 8 to about 120 mesh, U.S. Sieve Series. A major advantage of using this method is there is no need for the particulates to be sieved or screened to a particular particle mesh size or particular particle size distribution, but rather a wide or broad particle size distribution can be used.

In some embodiments, it may be desirable to use substantially non-spherical particulates. Suitable substantially non-spherical particulates may be cubic, polygonal, fibrous, or any other non-spherical shape. Such substantially non-spherical particulates may be, for example, cubic-shaped, rectangular-shaped, rod-shaped, ellipse-shaped, cone-shaped, pyramid-shaped, or cylinder-shaped. That is, in embodiments wherein the particulates are substantially non-spherical, the aspect ratio of the material may range such that the material is fibrous to such that it is cubic, octagonal, or any other configuration. Substantially non-spherical particulates may be generally sized such that the longest axis is from a lower limit of about 0.02 inches ("in"), 0.04 in, 0.06 in, 0.08 in, 0.1 in, 0.12 in, 0.14 in, and 0.16 in to an upper limit of about 0.3 in, 0.28 in, 0.26 in, 0.24 in, 0.22 in, 0.2 in, 0.18 in, and 0.16 in in length, and encompassing any value and any subset therebetween. In other embodiments, the longest axis is from about 0.05 inches to about 0.2 inches in length. In one embodiment, the substantially non-spherical particulates may be cylindrical, having an aspect ratio of about 1.5 to 1, a diameter of about 0.08 in, and a length of about 0.12 in. In another embodiment, the substantially non-spherical particulates may be cubic, having sides of about 0.08 inches in length. The use of substantially non-spherical particulates may be desirable in some embodiments because, among other things, they may provide a lower rate of settling when slurried into the treatment fluid (e.g., prior to reacting the gelling agent and the crosslinking agent). By so resisting settling, substantially non-spherical particulates may provide improved particulate distribution as compared to more spherical particulates. It will be appreciated by one of skill in the art, however, that any combination of spherical and non-spherical particulates may be used for forming the crosslinker-coated particulates and the treatment fluids described in some embodiments herein, without departing from the scope of the present disclosure.

In some embodiments of the present disclosure, a portion of the particulates may be formed from degradable particles. As used herein, the term "particulate" may therefore refer to non-degradable particulates or a combination of non-degradable and degradable particulates, all of which may form crosslinker-coated particulates in accordance with the methods described herein.

In some embodiments, such as where the crosslinker-coated particulates are placed into a fracture to form a proppant pack, the degradable particulates may be included to increase the permeability of the propped fracture. The degradable particulates may be preferably substantially uniformly distributed throughout the formed proppant pack. Over time, the degradable particulates will degrade, in situ, causing the degradable material to substantially be removed from the proppant pack and to leave behind voids in the proppant pack. These voids enhance the porosity of the proppant pack, which may result, in situ, in enhanced conductivity.

Suitable degradable materials may include oil-degradable polymers. Oil-degradable polymers that may be used in accordance with the embodiments of the present disclosure may be either natural or synthetic polymers. Some particular examples may include, but are not limited to, polyacrylics, polyamides, polyolefins (e.g., polyethylene, polypropylene, polyisobutylene), polystyrene, and any combination thereof. Other suitable oil-degradable polymers may include those that have a melting point which is such that the polymer will dissolve at the temperature of the subterranean formation in which it is placed, such as a wax material.

In addition to oil-degradable polymers, other degradable materials that may be used in conjunction with the embodiments of the present disclosure may include, but are not limited to, degradable polymers, dehydrated salts, and any combination thereof. As for degradable polymers, a polymer is considered to be "degradable" herein if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

It may be desirable that the degradable particulate has similar particle size, shape, and specific gravity as those of the particulates described herein to enhance the distribution of degradable particulate among the lightweight particulate and to minimize the segregation between the particulate materials.

Suitable examples of degradable polymers that may be used in accordance with the embodiments of the present disclosure may include, but are not limited to, polysaccharides (e.g., dextran or cellulose), chitins, chitosans, proteins, aliphatic polyesters, poly(lactides), poly(glycolides), poly(ε-caprolactones), poly(hydroxybutyrates), poly(anhydrides), aliphatic or aromatic polycarbonates, poly(orthoesters), poly(amino acids), poly(ethylene oxides), polyphosphazenes, and any combination thereof. Of these suitable polymers, aliphatic polyesters and polyanhydrides may be preferred.

Polyanhydrides are another type of particularly suitable degradable polymer useful in the embodiments of the present disclosure. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides may include, but are not limited to, poly(adipic anhydride), poly(suberic anhydride), poly(sebacic anhydride), poly(dodecanedioic anhydride), and any combination thereof. Other suitable examples may include, but are not limited to, poly(maleic anhydride) and poly(benzoic anhydride).

Dehydrated salts may be used in accordance with the embodiments of the present disclosure as a degradable material. A dehydrated salt may be suitable if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), anhydrous boric acid, and any combination thereof. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example may include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components of the treatment fluids and/or proppant packs described herein. The choice of degradable material also can depend, at least in part, on the conditions of the well (e.g., well bore temperature). For instance, lactides have been found to be suitable for lower temperature wells, including those within the range of about 15.6° C. to about 65.6° C. (or about 60° F. to about 150° F.), and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments a preferable result is achieved if the degradable material degrades slowly over time as opposed to instantaneously. In those embodiments, in which the crosslinker-coated particulates are used to form a proppant pack, where degradable particulates are used, a preferable result may be obtained when the degradable material does not begin to degrade until after the proppant pack has developed some compressive strength. The slow degradation of the degradable material, in situ, may help to maintain the stability of the proppant pack.

In some embodiments, from a lower limit of about 10%, 15%, 20%, 25%, 30%, 35%, 40%, and 45% to an upper limit of about 90%, 85%, 80%, 75%, 70%, 65%, 60%, 55%, 50%, and 45% of the total particulates used to form the crosslinker-coated particulates may be degradable, encompassing any value and subset therebetween. In other embodiments, from about 20% to about 70% of the total particulates used to form the crosslinker-coated particulates may be degradable. In still other embodiments, from about 25% to about 50% of the total particulates used to form the crosslinker-coated particulates may be degradable.

The particulates described herein may be used to form the crosslinker-coated particulates by first coating a stabilizing agent at least partially onto the particulate. Any stabilizing agent capable of providing a coating onto the particulates atop which a crosslinking agent may thereafter be coated (e.g., by providing a tacky surface for the crosslinking agent, by permitting absorption of the crosslinking agent onto the stabilizing agent, and the like) may be suitable for use in the embodiments described herein, provided, however, that the stabilizing agent is capable of imparting a hydrophobic nature to the particulates. Examples of suitable stabilizing agents for use in the embodiments described herein may include, but are not limited to, an aqueous tackifying agents, a non-aqueous tackifying agent, an emulsified tackifying agent, a silyl-modified polyamide compound, a resin, a polymerizable organic monomer composition, a consolidating agent emulsion, a zeta-potential modifying aggregating compositions, a silicon-based resins, a binder, and any combination thereof. In some embodiments, aqueous stabilizing agents may be preferred, as they may provide high flashpoints which are much safer during the coating process to form the crosslinker-coated particulates described herein, especially with potential buildup of static charges and volatile surfactants.

In some embodiments, the stabilizing agent may be pre-coated onto the particulates or may be coated on-the-fly onto the particulates at the wellsite, such as, as the treatment fluid is being introduced into the subterranean formation. Generally, the stabilizing agent may be present in an amount sufficient to be at least partially coated onto the particulates and to hold or otherwise have coated thereon an amount of crosslinking agent sufficient for forming the crosslinker-coated particulates, as described herein. In some embodiments, the stabilizing agent may be used in an amount in the range of from a lower limit of about 0.0001%, 0.00025%, 0.0005%, 0.00075%, 0.001%, 0.0025%, 0.005%, 0.0075%, 0.01%, 0.025%, 0.05%, 0.075%, 0.1%, 0.25%, 0.5%, 0.75%, and 1% to an upper limit of about 5%, 4.75%, 4.5%, 4.25%, 4%, 3.75%, 3.5%, 3.25%, 3%, 2.75%, 2.5%, 2.25%, 2%, 1.75%, 1.5%, 1.25%, and 1% by weight of the particulates to be at least partially coated, encompassing any value and subset therebetween.

Aqueous tackifying agents suitable for use in the embodiments of the present disclosure are usually not generally significantly tacky when placed onto a particulate, but are capable of being "activated" (e.g., destabilized, coalesced and/or reacted) to transform the compound into a sticky, tacky compound at a desirable time. Such activation may occur before, during, or after the aqueous tackifier agent is placed in a subterranean formation. In some embodiments, a pretreatment may be first contacted with the surface of a particulate to prepare it to be coated with an aqueous tackifing agent. Suitable aqueous tackifying agents may be charged polymers that comprise compounds that, when in an aqueous solvent or solution, will form a non-hardening coating (by itself or with an activator) and, when placed on a particulate, will increase the continuous critical resuspension velocity of the particulate when contacted by a stream of water. The aqueous tackifing agent may enhance the grain-to-grain contact between the individual particulates within the formation (be they proppant particulates, formation fines, or other particulates), helping bring about the consolidation of the particulates into a cohesive, flexible, and permeable mass (e.g., a proppant pack).

Suitable aqueous tackifying agents may include any polymer that can bind, coagulate, or flocculate a particulate. Also, polymers that function as pressure-sensitive adhesives may be suitable. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers may include, but are not limited to, dialkyl amino alkyl (meth)acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

In some embodiments, the stabilizing agent may comprise a non-aqueous tackifying agent. A particularly preferred group of non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. Such products may include compounds such as combinations of dibasic acids containing some trimer and higher oligomers and also small amounts of monomer acids that are reacted with polyamines. Other polyacids may include trimer acids, synthetic acids produced from fatty acids, maleic anhydride, acrylic acid, and the like. Combinations of these may be suitable as well.

Additional compounds which may be used as non-aqueous tackifying agents may include liquids and solutions of, for example, polyesters, polycarbonates, silyl-modified polyamide compounds, polycarbamates, urethanes, natural resins such as shellac, and the like. Combinations of these may be suitable as well.

Non-aqueous tackifying agents suitable for use in the embodiments herein may either be used such that they form a non-hardening coating on a particulate surface or they may be combined with a multifunctional material capable of reacting with the non-aqueous tackifying agent to form a hardened coating. A "hardened coating," as used herein, means that the reaction of the non-aqueous tackifying compound with the multifunctional material should result in a substantially non-flowable reaction product that exhibits a higher compressive strength in a consolidated agglomerate than the non-aqueous tackifying compound alone with the particulates. In this instance, the non-aqueous tackifying agent may function similarly to a hardenable resin.

Multifunctional materials suitable for use in the embodiments described herein may include, but are not limited to, an aldehyde, a dialdehyde (e.g., glutaraldehyde); a hemiacetal-releasing compound, an aldehyde-releasing compound; a diacid halide; a dihalide (e.g., a dichloride, a dibromide, and the like); a polyacid anhydride; an epoxide; a furfuraldehyde; an aldehyde condensate; and any combination thereof.

In some embodiments, the multifunctional material may be mixed with the non-aqueous tackifying compound in an amount of a lower limit of about 0.01%, 1%, 5%, 10%, 15%, 20%, and 25% to an upper limit of about 50%, 45%, 40%, 35%, 30%, and 25% by weight of the non-aqueous tackifying compound, encompassing any value and any subset therebetween. In other embodiments, the multifunctional material is present in an amount of about 0.5% to about 1% by weight of the non-aqueous tackifying compound.

In some embodiments, the aqueous tackifying agent and/or the non-aqueous tackifying agent may be emulsified in an aqueous, an oil base fluid, or a solvent, wherein the aqueous tackifying agent and/or the non-aqueous tackifying agent may comprise either the continuous external phase or the discontinuous internal phase of the emulsion. One of skill in the art, with the benefit of this disclosure, will recognize whether to include the aqueous tackifying agents and/or the non-aqueous tackifying agents in an emulsion form for use in forming the crosslinker-coated particulates described herein.

Silyl-modified polyamide compounds may be described as substantially self-hardening compositions that are capable of at least partially adhering to particulates in the unhardened state, and that are further capable of self-hardening themselves to a substantially non-tacky state. Such silyl-modified polyamides may be based, for example, on the reaction product of a silylating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments described herein, the stabilizing agent may comprise a resin. The term "resin," as used herein, refers to any of numerous physically similar polymerized synthetics or chemically modified natural resins including thermoplastic materials and thermosetting materials. Resins that may be suitable for use in the embodiments of the present disclosure may include substantially all resins known and used in the art.

One type of resin suitable for use in the embodiments herein may be a two-component epoxy-based resin comprising a liquid hardenable resin component and a liquid hardening agent component. The liquid hardenable resin component may comprise a hardenable resin and an optional solvent. The solvent may be added to the resin to reduce its viscosity for ease of handling, mixing and transferring. It is within the ability of one skilled in the art, with the benefit of this disclosure, to determine if and how much solvent may be needed to achieve a viscosity suitable to the subterranean conditions. Factors that may affect this decision include geographic location of the well, the surrounding weather conditions, the desired long-term stability of the stabilizing agent, and the like. An alternate way to reduce the viscosity of the hardenable resin is to heat it. The second component is the liquid hardening agent component, which comprises a hardening agent, an optional silane coupling agent, a surfactant, an optional hydrolyzable ester for, among other things, breaking gelled fracturing fluid films on proppant particulates, and an optional liquid carrier fluid for, among other things, reducing the viscosity of the hardening agent component.

Examples of hardenable resins that can be used in the liquid hardenable resin component may include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxy resins, and any combination thereof. In some embodiments, the hardenable resin may comprise a urethane resin.

The hardenable resin may be included in the liquid hardenable resin component in an amount in the range of a lower limit of about 5%, 10%, 20%, 30%, 40%, and 50% to an upper limit of about 100%, 90%, 80%, 70%, 60%, and 50% by weight of the liquid hardenable resin component, encompassing any value and any subset therebetween. It is within the ability of one skilled in the art, with the benefit of this disclosure, to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and any combination thereof. Other preferred solvents may include aqueous dissolvable solvents such as, for example, methanol, isopropanol, butanol, and glycol ether solvents, and combinations thereof. Suitable glycol ether solvents may include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, and hexoxyethanol, and isomers thereof. Selection of an appropriate solvent is dependent on the resin composition chosen and is within the ability of one skilled in the art, with the benefit of this disclosure.

As described above, use of a solvent in the liquid hardenable resin component is optional but may be desirable to reduce the viscosity of the hardenable resin component for ease of handling, mixing, and transferring. However, as previously stated, it may be desirable in some embodiments to not use such a solvent for environmental or safety reasons. It is within the ability of one skilled in the art, with the benefit of this disclosure, to determine if and how much solvent is needed to achieve a suitable viscosity. In some embodiments, the amount of the solvent used in the liquid hardenable resin component may be in the range from a lower limit of about 0.1%, 1%, 2%, 4%, 6%, 8%, 10%, 12%, 14% and 16% to an upper limit of about 30%, 28%, 26%, 24%, 22%, 20%, 18%, and 16% by weight of the liquid hardenable resin component, encompassing any value and any subset therebetween. Optionally, the liquid hardenable resin component may be heated to reduce its viscosity, in place of, or in addition to, using a solvent.

Examples of the hardening agents that may be used in the liquid hardening agent component may include, but are not limited to, a cyclo-aliphatic amine (e.g., piperazine, derivatives of piperazine (e.g., aminoethylpiperazine), modified piperazines, and the like), an aromatic amine (e.g., methylene dianiline, derivatives of methylene dianiline and hydrogenated forms, 4,4'-diaminodiphenyl sulfone, and the like), an aliphatic amine (e.g., ethylene diamine, diethylene triamine, triethylene tetraamine, tetraethylene pentaamine, and the like), an imidazole, a pyrazole, a pyrazine, a pyrimidine, a pyridazine, a 1H-indazole, a purine, a phthalazine, a naphthyridine, a quinoxaline, a quinazoline, a phenazine, an imidazolidine, a cinnoline, an imidazoline, a 1,3,5-triazine, a thiazole, a pteridine, an indazole, an amine, a polyamine, an amide, a polyamide, a 2-ethyl-4-methyl imidazole, and any combination thereof. The chosen hardening agent often effects the range of temperatures over which a hardenable resin is able to cure. By way of example, and not of limitation, in subterranean formations having a temperature of about 15.6° C. to about 121.1° C. (or about 60° F. to about 250° F.), amines and cyclo-aliphatic amines such as piperidine, triethylamine, tris(dimethylaminomethyl) phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 10° C. (about 50° F.) to as high as about 176.7° C. (about 350° F.).

The hardening agent used may be included in the liquid hardening agent component in an amount sufficient to at least partially harden the resin composition. In some embodiments described herein, the hardening agent used may be included in the liquid hardening agent component in the range of from a lower limit of about 0.1%, 1%, 5%, 10%, 15%, 20%, 25%, 30%, 35%, 40%, and 45% to about 95%, 90%, 85%, 80%, 75%, 70%, 65%, 60%, 55%, 50%, and 45% by weight of the liquid hardening agent component, encompassing any value and any subset therebetween. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the consolidating agent may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, both the liquid hardenable resin component and the liquid hardening agent component may both be emulsified in water.

The optional silane coupling agent may be used, among other things, to act as a mediator to help bond the resin to the particulates for forming the crosslinker-coated particulates described herein. Examples of suitable silane coupling agents may include, but are not limited to, N-2-(aminoethyl)-3-aminopropyltrimethoxysilane, 3-glycidoxypropyltrimethoxysilane, and any combination thereof. The silane coupling agent may be included in the resin component or the liquid hardening agent component (according to the chemistry of the particular group as determined by one skilled in the art with the benefit of this disclosure). In some embodiments, the silane coupling agent used may be included in the liquid hardening agent component in the range of from a lower limit of about 0.1%, 0.2%, 0.3%, 0.4%, 0.5%, 0.6%, 0.7%, 0.8%, 0.9%, 1%, 1.1%, 1.2%, 1.3%, 1.4%, and 1.5% to an upper limit of about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the liquid hardening agent component, encompassing any value and any subset therebetween.

Any surfactant compatible with the hardening agent and capable of facilitating the coating of the resin onto particulates may be used in the liquid hardening agent component. Such surfactants may include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, one or more nonionic surfactants, and any combination thereof. Some suitable combinations may include of one or more cationic and nonionic surfactants. The surfactant or surfactants that may be used are included in the liquid hardening agent component in an amount in the range of from a lower limit of about 1%, 1.5%, 2%, 2.5%, 3%, 3.5%, 4%, 4.5%, and 5% to an upper limit of about 10%, 9.5%, 9%, 8.5%, 8%, 7.5%, 7%, 6.5%, 6%, 5.5%, and 5% by weight of the liquid hardening agent component, encompassing any value and any subset therebetween.

While not required, examples of hydrolyzable esters that may be used in the liquid hardening agent component may include, but are not limited to, a combination of dimethylglutarate, dimethyladipate, and dimethylsuccinate; dimethylthiolate; methyl salicylate; dimethyl salicylate; and dimethylsuccinate; and any combination thereof. When used, a hydrolyzable ester may be included in the liquid hardening agent component in an amount in the range of from a lower limit about 0.1%, 0.2%, 0.3%, 0.4%, 0.5%, 0.6%, 0.7%, 0.8%, 0.9%, 1%, 1.1%, 1.2%, 1.3%, 1.4%, and 1.5% to an upper limit of about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the liquid hardening agent component, encompassing any value and any subset therebetween. In some embodiments, a hydrolyzable ester may be included in the liquid hardening agent component in an amount in the range of about 1% to about 2.5% by weight of the liquid hardening agent component.

Use of a diluent or liquid carrier fluid in the liquid hardening agent component is optional and may be used to reduce the viscosity of the liquid hardening agent component for ease of handling, mixing, and transferring. As previously stated, it may be desirable in some embodiments to not use such a solvent for environmental or safety reasons. Any suitable carrier fluid that is compatible with the liquid hardening agent component and achieves the desired viscosity effects is suitable for use in the embodiments of the present disclosure. Some suitable liquid carrier fluids are those having high flash points (e.g., about 51.7° C. (or about 125° F.)) because of, among other things, environmental and safety concerns; such solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, and fatty acid methyl esters, and any combination thereof. Other suitable liquid carrier fluids include aqueous dissolvable solvents such as, for example, methanol, isopropanol, butanol, glycol ether solvents, and any combination thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, hexoxyethanol, any isomers thereof, and any combination thereof. Selection of an appropriate liquid carrier fluid is dependent on, inter alia, the resin composition chosen.

Other resins suitable for use in the embodiments of the present disclosure are furan-based resins. Suitable furan-based resins may include, but are not limited to, furfuryl alcohol resins, furfural resins, combinations of furfuryl alcohol resins and aldehydes, combinations of furan resins and phenolic resins, and any combination thereof. Of these, furfuryl alcohol resins may be preferred. A furan-based resin may be combined with a solvent to control viscosity, if desired. Suitable solvents for use in the furan-based stabilizing agents of the embodiments herein may include, but are not limited to, 2-butoxy ethanol, butyl lactate, butyl acetate, tetrahydrofurfuryl methacrylate, tetrahydrofurfuryl acrylate, esters of oxalic, maleic acid, succinic acid, furfuryl acetate, and any combination thereof. Of these, 2-butoxy ethanol may be preferred. In some embodiments, the furan-based resins suitable for use in the embodiments of the present disclosure may be capable of enduring temperatures well in excess of about 176.7° C. (or about 350° F.) without degrading. In some embodiments, the furan-based resins suitable for use in the embodiments of the present disclosure may be capable of enduring temperatures up to about 371.1° C. (or about 700° F.) without degrading.

Optionally, the furan-based resins suitable for use in the embodiments of the present disclosure may further comprise a curing agent to facilitate or accelerate curing of the furan-based resin at lower temperatures. The presence of a curing agent may be particularly useful in embodiments where the furan-based resin may be placed within subterranean formations having temperatures below about 176.7° C. (or about 350° F.). Examples of suitable curing agents may include, but are not limited to, organic or inorganic acids, such as, inter alia, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and any combination thereof. In those embodiments where a curing agent is not used, the furan-based resin may cure autocatalytically.

Still other resins suitable for use in the methods of the embodiments of the present disclosure are phenolic-based resins. Suitable phenolic-based resins may include, but are not limited to, terpolymers of phenol, phenolic formaldehyde resins, a combination of phenolic and furan resins, and any combination thereof. In some embodiments, a combination of phenolic and furan resins may be preferred. A phenolic-based resin may be combined with a solvent to control viscosity if desired. Suitable solvents for use in the embodiments of the present disclosure may include, but are not limited to butyl acetate, butyl lactate, furfuryl acetate, 2-butoxy ethanol, and any combination thereof. Of these, 2-butoxy ethanol may be preferred in some embodiments.

Yet another resin-type material suitable for use in the methods of the embodiments described herein is a phenol/phenol formaldehyde/furfuryl alcohol resin comprising of about 5% to about 30% phenol, of about 40% to about 70% phenol formaldehyde, of about 10% to about 40% furfuryl alcohol, of about 0.1% to about 3% of a silane coupling agent, and of about 1% to about 15% of a surfactant, each range encompassing any value and any subset therebetween. In the phenol/phenol formaldehyde/furfuryl alcohol resins suitable for use as a stabilizing agent in the embodiments described herein, suitable silane coupling agents may include, but are not limited to, N-2-(aminoethyl)-3-aminopropyltrimethoxysilane, 3-glycidoxypropyltrimethoxysilane, and any combination thereof. Suitable surfactants may include, but are not limited to, an ethoxylated nonyl phenol phosphate ester, combinations of one or more cationic surfactants, and one or more nonionic surfactants and an alkyl phosphonate surfactant.

In other embodiments, the stabilizing agents useful in the embodiments of the present disclosure may comprise polymerizable organic monomer compositions. Generally, suitable polymerizable organic monomer compositions comprise an aqueous fluid, a water-soluble polymerizable organic monomer, an oxygen scavenger, and a primary initiator.

The aqueous fluid component of the polymerizable organic monomer composition generally may be freshwater, salt water, brine, seawater, or any other aqueous liquid that does not adversely react with the other components used in accordance with this disclosure or with the subterranean formation, including those listed below with reference to the aqueous base fluids included in the treatment fluids described herein.

A variety of monomers may be suitable for use as the water-soluble polymerizable organic monomers in the embodiments of the present disclosure. Examples of suitable monomers may include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinylphosphonic acid, and methacryloyloxyethyl trimethylammonium sulfate, and any combination thereof. In some embodiments, the water-soluble polymerizable organic monomer should be self-crosslinking. Examples of suitable monomers which are thought to be self-crosslinking may include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, and polypropylene glycol methacrylate, and any combination thereof. Of these, hydroxyethylacrylate may be preferred in some instances. An example of a particularly suitable monomer is hydroxyethylcellulose-vinyl phosphoric acid. The water-soluble polymerizable organic monomer (or monomers where a combination thereof is used) should be included in the polymerizable organic monomer composition in an amount sufficient to form the desired gelled substance after placement on the particulates described herein. In some embodiments, the water-soluble polymerizable organic monomer may be included in the polymerizable organic monomer composition in an amount in the range of from a lower limit of about 1%, 2%, 4%, 6%, 8%, 10%, 12%, 14%, and 16% to an upper limit of about 30%, 28%, 26%, 24%, 22%, 20%, 18%, and 16% by weight of the aqueous fluid, encompassing any value and any subset therebetween. In another embodiment, the water-soluble polymerizable organic monomer may be included in the polymerizable organic monomer composition in an amount in the range of from about 1% to about 20% by weight of the aqueous fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on-the-fly, the stannous chloride may be predissolved in a hydrochloric acid solution. For example, the stannous chloride may be dissolved in about a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from a lower limit of about 0.005%, 0.01%, 0.1%, 0.5%, 1%, 1.5%, 2%, 2.5%, 3%, 3.5%, 4%, and 4.5% to an upper limit about 10%, 9.5%, 9%, 8.5%, 8%, 7.5%, 7%, 6.5%, 6%, 5.5%, 5%, and 4.5% by weight of the polymerizable organic monomer composition, encompassing any value and any subset therebetween. Generally, the stannous chloride may be included in the polymerizable organic monomer composition of the embodiments of the present disclosure in an amount in the range of from about 0.005% to about 0.1% by weight of the polymerizable organic monomer composition.

A primary initiator may be used, among other things, to initiate polymerization of the water-soluble polymerizable organic monomer(s). Any compound or compounds that form free radicals in aqueous solution may be used as the primary initiator. The free radicals may act, among other things, to initiate polymerization of the water-soluble polymerizable organic monomer present in the polymerizable organic monomer composition. Compounds suitable for use as the primary initiator may include, but are not limited to, alkali metal persulfates, peroxides, oxidation-reduction systems employing reducing agents (e.g., sulfites in combination with oxidizers), azo polymerization initiators, and any combination thereof. Suitable azo polymerization initiators may include, but are not limited to, 2,2'-azobis(2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Generally, the primary initiator should be present in the polymerizable organic monomer composition in an amount sufficient to initiate polymerization of the water-soluble polymerizable organic monomer(s). In certain embodiments, the primary initiator may be present in the polymerizable organic monomer composition in an amount in the range of from a lower limit of about 0.1%, 0.2%, 1.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween. One skilled in the art, with the benefit of this disclosure, will recognize that as the polymerization temperature increases, the required level of activator decreases.

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from a lower limit of about 0.1%, 0.2%, 1.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween.

Also optionally, the polymerizable organic monomer compositions of the embodiments of the present disclosure may further comprise a crosslinker for crosslinking the polymerizable organic monomer compositions in the desired gelled substance. In some embodiments, the crosslinker is a molecule or complex containing a reactive transition metal cation. A suitable crosslinker may comprise trivalent chromium cations complexed or bonded to anions, atomic oxygen, or water. Examples of suitable crosslinkers may include, but are not limited to, compounds or complexes containing chromic acetate and/or chromic chloride. Other suitable transition metal cations include chromium VI within a redox system, aluminum III, iron II, iron III, and zirconium IV. Generally, the crosslinker may be present in polymerizable organic monomer compositions in an amount in the range of from a lower limit of about 0.01%, 0.02%, 0.04%, 0.06%, 0.08%, 0.1%, 0.2%, 0.4%, 0.6%, 0.8%, 1%, 1.2%, 1.4%, 1.6%, 1.8%, and 2% to an upper limit of about 5%, 4.8%, 4.6%, 4.4%, 4.2%, 4%, 3.8%, 3.6%, 3.4%, 3.2%, 3%, 2.8%, 2.6%, 2.4%, 2.2%, and 2% by weight of the polymerizable organic monomer composition, encompassing any value and any subset therebetween.

In some embodiments, the stabilizing agent may comprise a consolidating agent emulsion that comprises an aqueous fluid, an emulsifying agent, and a consolidating agent. The consolidating agent in suitable emulsions may be either a non-aqueous tackifying agent or a resin, such as those described above. These consolidating agent emulsions have an aqueous external phase and organic-based internal phase. The term "emulsion" and any derivatives thereof as used herein refers to a combination of two or more immiscible phases and includes, but is not limited to, dispersions and suspensions.

Suitable consolidating agent emulsions comprise an aqueous external phase comprising an aqueous fluid. Suitable aqueous fluids that may be used in the consolidating agent emulsions of the embodiments of the present disclosure include freshwater, salt water, brine, seawater, or any other aqueous fluid that, preferably, does not adversely react with the other components used in accordance with this disclosure or with the subterranean formation, including those listed below with reference to the aqueous base fluids included in the treatment fluids described herein. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the consolidating agent emulsions of the embodiments of the present disclosure before it becomes problematic for the stability of the emulsion. The aqueous fluid may be present in the consolidating agent emulsions in an amount in the range of from a lower limit of about 20%, 22%, 24%, 26%, 28%, 30%, 32%, 34%, 36%, 38%, 40%, 42%, 44%, 46%, 48%, 50%, 52%, 54%, 56%, 58%, and 60% to an upper limit of about 99.9%, 98%, 96%, 94%, 92%, 90%, 88%, 86%, 84%, 82%, 80%, 78%, 76%, 74%, 72%, 70%, 68%, 66%, 64%, 62%, and 60% by weight of the consolidating agent emulsion composition, encompassing any value and any subset therebetween. In some embodiments, the aqueous fluid may be present in the consolidating agent emulsions in an amount in the range of about 60% to 99.9% by weight of the consolidating agent emulsion composition. In some embodiments, the aqueous fluid may be present in the consolidating agent emulsions in an amount in the range of about 95% to 99.9% by weight of the consolidating agent emulsion composition.

The consolidating agent in the emulsion may be either a non-aqueous tackifying agent or a resin, such as those described above. The consolidating agents may be present in a consolidating agent emulsion in an amount in the range of from a lower limit of about 0.1%, 1%, 5%, 10%, 15%, 20%, 25%, 30%, 35%, and 40% to an upper limit about 80%, 75%, 70%, 65%, 60%, 55%, 50%, 45%, and 40% by weight of the consolidating agent emulsion composition, encompassing any value and any subset therebetween. In some embodiments, the consolidating agent may be present in a consolidating agent emulsion in an amount in the range of about 0.1% to about 40% by weight of the composition. In some embodiments, the consolidating agent may be present in a consolidating agent emulsion in an amount in the range of about 0.1% to about 5% by weight of the composition.

As previously stated, the consolidating agent emulsions comprise an emulsifying agent. Examples of suitable emulsifying agents may include, but are not limited to, surfactants, proteins, hydrolyzed proteins, lipids, glycolipids, and nanosized particulates, including, but not limited to, fumed silica. Combinations of these may be suitable as well.

In some embodiments, the stabilizing agent may comprise an aggregating composition, which can modify the zeta potential or aggregation potential of a particulate. Such modifications can permit any two surfaces (e.g., of particulates, of a particulate and a substrate, etc.) to have a greater attraction for one another.

Aggregating compositions suitable for use in the embodiments of the present disclosure may include, but are not limited to, a reaction product of an amine and a phosphate ester, where the aggregating composition is designed to coat the particulates for forming the crosslinker-coated particulates described herein with the reaction product to change the zeta potential or aggregation potential of the surface.

Suitable amines may include, but are not limited to, any amine that is capable of reacting with a suitable phosphate ester to form a composition that forms a deformable coating on a surface. Exemplary examples of such amines may include, but are not limited to, any amine of the general formula R1,R2NH or mixtures or combinations thereof, where R1 and R2 are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in the embodiments herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate esters may include, but are not limited to, any phosphate ester that is capable of reacting with a suitable amine to form a composition that forms a deformable coating on a surface. Exemplary examples of such phosphate esters include, but are not limited to, any phosphate esters of the general formula P(O)(OR3)(OR4)(OR5) or mixture or combinations thereof, where R3, R4, and OR5 are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters may include, but are not limited to, phosphate ester of alkanols having the general formula P(O)(OH)x(OR6)y where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters may include, but are not limited to, phosphate esters of alkanol amines having the general formula N[R7OP(O)(OH)2]3 where R7 is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters may include, but are not limited to, phosphate esters of hydroxylated aromatics, such as phosphate esters of alkylated phenols such as nonylphenyl phosphate ester or phenolic phosphate esters. Other exemplary examples of phosphate esters may include, but are not limited to, phosphate esters of diols and polyols such as phosphate esters of ethylene glycol, propylene glycol, or higher glycolic structures. Other exemplary phosphate esters may include, but are not limited to, any phosphate ester than can react with an amine and coated on to a particulate forms a deformable coating enhancing the aggregating potential of the particulate.

Suitable silicon-based resins include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and has a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments of the present disclosure may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group may include, but are not limited to, a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group, and the like, and any combination thereof. The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include (a) a compound comprising a reactive group of Formula I:

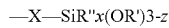       Formula I wherein X comprises a hydrocarbon chain; wherein x=0 to 2 and z=0 to 2; wherein R' and R" comprises hydrogen, a halogen, an amide, a halogen, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same (identical) or different; and wherein when z is 0 or 1, then each R' may be the same or different;
and,
(b) a polysiloxane comprising a reactive functional group that comprises at least one of the following structural units of Formula II:

       Formula II wherein R1 comprises hydrogen, hydroxyl, a hydrocarbon chain, or a siloxane chain; wherein R2 comprises a functional group; and wherein m and n fulfill the requirements of 0<n<4, 0<m<4 and 2<(m+n)<4; and wherein when n>1, then each R1 may be the same or different; and wherein when m>1, then each R2 may be the same or different. In certain embodiments, the functional group of R2 comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include a compound comprising an organofunctional polysiloxane polymer as a binding resin obtaining the polymeric structure as part of a curing mechanism or a combination thereof. The curing mechanism of such siloxane coatings is a two step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the following Formula III:

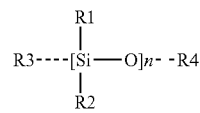

Formula III wherein, for each repeating polymer unit, R1, R2 and R3 are independently selected from the group consisting of alkyl, aryl, reactive glycidoxy groups having up to 20 carbon atoms, and OSi(OR5)3 groups, wherein each R5 independently has the same meaning as R1, R2 or R3, and R4 are is either alkyl, aryl or hydrogen, and wherein n is selected so as that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used, examples of suitable polymers include, but are not limited to, a polyalkyl (e.g., polyethers, polyalkanes, polyalkenes, polyalkynes, and the like), a substituted alkyl monomer (e.g., styrene), an acrylic, and any combination thereof. Examples of suitable reactive silicon end groups may include, but are not limited to, triethoxysilanes, methyldiethoxysilanes, trisilanols, alkoxysilanes, substituted silanes, multi-silanols, and any combination thereof. One suitable polymer having a reactive silicon end group that may be used in particular embodiments of the present disclosure is a silane-modified poly(propylene oxide) oligomer.

Generally, any suitable silane coupling agent may be used in accordance with particular embodiments of the present disclosure. Examples of suitable silane coupling agents may include, but are not limited to, N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltris (beta-methoxyethoxy) silane, r-metacryloxypropyltrimethoxysilane, beta-(3,4 epoxycyclohexyl)-ethyltrimethoxysila, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, r-aminopropyltriethoxysilane, N-[3-(trimethoxysilyl)propyl]-ethylenediamine, substituted silanes where one or more of the substitutions contains a different functional group, and any combination thereof. In some embodiments, the silane coupling agent may be present in the silicon-based resin composition in an amount of from a lower limit of about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the composition, and preferably in an amount from about 0.5% to about 3% by weight of the composition, encompassing any value and any subset therebetween.

In addition, binders may be used as the stabilizing agents of the embodiments described herein. Suitable binders may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the embodiments of the present disclosure may generally comprise:

(I) a consolidant comprising a hydrolyzate or precondensate of:

(a) at least one organosilane of the general Formula IV:

$$R_nSiX_{4-n} \quad \text{Formula IV}$$

in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general Formula V:

$$SiX_4 \quad \text{Formula V}$$

in which the X radicals are each as defined above, and (c) at least one metal compound of the general Formula VI:

$$MX_a \quad \text{Formula VI}$$

in which M is a metal of main groups I to VIII or of transition groups II to VIII of the Periodic Table of the Elements including boron, X is as defined in Formula IV, where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the consolidant is cured under elevated pressure and elevated temperature, where the consolidant, in the case that it is used to change the wetting behavior of the formation, also comprises an oleophobic and hydrophobic component. Comprehensive investigations have shown that these consolidants are not decomposed even in autoclaves at high pressure and high temperature even over a prolonged period, and also still form a stable bond under these conditions. In the case of use of a wetting-regulating consolidation variant, it was shown that the wetting behavior established is retained after a hydrothermal treatment in corrosive medium. The consolidation also reduces the porosity only to a slight degree.

In some embodiments, the stabilizing agent may also comprise an optional catalyst to facilitate curing. Generally, any suitable catalyst may be used in the stabilizing agent compositions described herein. Examples of suitable catalysts may include, but are not limited to, tertiary amine catalysts, titanium chelate catalysts, tin catalysts, lead catalysts, bismuth catalysts, and any combination thereof. One suitable catalyst that may be used in particular embodiments of the present disclosure is dibutylbis(2,4-pentanedionate-O,O')—, (OC-6-11). In some embodiments, the catalyst may be present in the stabilizing agent composition in an amount from about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the composition, and preferably in an amount from about 1% to about 3% by weight of the composition, encompassing any value and any subset therebetween.

The crosslinking agent may be coated onto the particulates atop the stabilizing agent coated directly onto the particulates. In other embodiments, the treatment fluid may comprise one or more additional crosslinking agents that are not coated onto the crosslinker-coated particulates, which may be the same or different that the crosslinking agent(s) coated onto the crosslinker-coated particulates. In preferred embodiments, the additional crosslinking agent(s) may the same type of crosslinking agent(s) coated onto the particulates forming the crosslinker-coated particulates. The additional crosslinking agent(s) in the treatment fluid may synergistically operate to suspend the crosslinker-coated particulates by providing another means of viscosifying the treatment fluid. Generally, such inclusion of additional crosslinking agent(s) not coated on the crosslinker-coated particulates, if used, will be a substantially reduced amount compared to the amount of crosslinking agent traditionally included in treatment fluids. Suitable crosslinking agents for use in the embodiments described herein may include, but are not limited to, a metal crosslinking agent, a polymeric crosslinking agent, and any combination thereof.

In some embodiments, the crosslinking agent may be pre-coated onto the particulates or may be coated on-the-fly onto the particulates at the wellsite atop the stabilizing agent. Generally, the crosslinking agent may be present in an amount sufficient to be at least partially coated onto the particulates and to provide sufficient crosslinking reactivity with the gelling agent to suspend the crosslinker-coated particulates in the treatment fluid, as described herein. In some embodiments, the crosslinking agent may be present in an amount in the range of from a lower limit of about 0.0001%, 0.00025%, 0.0005%, 0.00075%, 0.001%, 0.0025%, 0.005%, 0.0075%, 0.01%, 0.025%, 0.05%, 0.075%, 0.1%, 0.25%, 0.5%, 0.75%, and 1% to an upper limit of about 5%, 4.75%, 4.5%, 4.25%, 4%, 3.75%, 3.5%, 3.25%, 3%, 2.75%, 2.5%, 2.25%, 2%, 1.75%, 1.5%, 1.25%, and 1% by weight of the particulates to be at least partially coated, encompassing any value and subset therebetween. In those embodiments in which additional crosslinking agent(s) are included in the treatment fluid in a form that is not coated onto the particulates, the crosslinking agent may be present in an amount in the range of from a lower limit of about 0.0001%, 0.00025%, 0.0005%, 0.00075%, 0.001%, 0.0025%, 0.005%, 0.0075%, 0.01%, 0.025%, 0.05%, 0.075%, 0.1%, 0.25%, 0.5%, 0.75%, and 1% to an upper limit of about 5%, 4.75%, 4.5%, 4.25%, 4%, 3.75%, 3.5%, 3.25%, 3%, 2.75%, 2.5%, 2.25%, 2%, 1.75%, 1.5%, 1.25%, and 1% by weight of the treatment fluid.

When included, suitable crosslinking agents may be present in the treatment fluids useful in the methods of the present disclosure in an amount sufficient to provide the desired degree of crosslinking between molecules of the gelling agent. In certain embodiments, the crosslinking agent may be present in the first treatment fluids and/or second treatment fluids of the embodiments of the present disclosure in an amount in the range of from about 0.005% to about 1% by weight of the treatment fluid. In certain embodiments, the crosslinking agent may be present in the treatment fluids of the embodiments of the present disclosure in an amount in the range of from about 0.05% to about 1% by weight of the first treatment fluid and/or second treatment fluid. One of ordinary skill in the art, with the benefit of this disclosure, will recognize the appropriate amount of crosslinking agent to include in a treatment fluid of the embodiments of the present disclosure based on, among other things, the temperature conditions of a particular application, the type of gelling agents used, the molecular weight of the gelling agents, the desired degree of viscosification, and/or the pH of the treatment fluid.

The metal crosslinking agents may comprise a borate ion, a metal ion, or similar component that is capable of crosslinking at least two molecules of the gelling agent in the treatment fluid. Examples of metal suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and any combination thereof.

In some embodiments, the crosslinking agent may be a polymeric crosslinking agent, such as, for example, a multifunctional boronic crosslinking agent. In some embodiments, the multifunctional boronic acid crosslinking agents may be capable of crosslinking the fluid at or close to a neutral pH. In some embodiments, the multifunctional boronic acid crosslinking agents of the present disclosure may comprise a polymeric backbone with a boronic acid functional group attached at one or more points along the polymer chain. In some embodiments, the multifunctional boronic acid cross agents may comprise a copolymer that comprises at least one boronic acid monomer unit and at least one water-soluble monomer unit. In some embodiments, the multifunctional boronic acid crosslinking agents may comprise a random copolymer of at least one boronic acid monomer unit and at least one water-soluble monomer unit, particularly a random copolymer in which the boronic acid monomer units are distributed over substantially all of the polymer chain length. In alternative embodiments, the multifunctional boronic acid crosslinking agents may comprise a copolymer that is a gradient copolymer. In other embodiments, the multifunctional boronic acid crosslinking agents can comprise a copolymer that is not a gradient copolymer. In some embodiments, the multifunctional boronic acid crosslinking agents of the present disclosure may comprise a copolymer that has less gradient copolymer character than a similar copolymer produced by conventional synthetic techniques.

In general, any boronic acid or boronate ester derived therefrom may be suitable for use in the multifunctional boronic acid crosslinking agents of the present disclosure. That is, the multifunctional boronic acid crosslinking agents of the present disclosure can contain a boronic acid group (e.g., $-B(OH)_2$) or a boronate ester derived therefrom. In some embodiments, the boronic acids may be aryl boronic acids, particularly vinyl aryl boronic acids. A suitable aryl boronic acid that can be suitable for practicing the present disclosure may include, but is not limited to, 4-vinylphenylboronic acid or its positional isomers. Other substituted aryl boronic acids containing a polymerizable functional group (e.g., alkene) and optional functionality on the aryl ring (e.g., alkyl groups, halogens, carbonyl groups, amines, hydroxyl groups, carboxylic acids and their derivatives, and the like) may also be used, if desired. In other embodiments, the boronic acids containing a polymerizable functional group may be alkyl, alkenyl, or alkynyl boronic acids (i.e., aliphatic boronic acids) in which the alkyl, alkenyl, or alkynyl groups can contain optional substitution, if desired.

In some embodiments, a polymeric multifunctional boronic acid crosslinking agent may be a block copolymer including, but not limited to, a diblock, triblock or multiblock copolymer. A polymeric multifunctional boronic acid crosslinking agent may also be a copolymer of various monomers and can also be in the form of comb, brush, or dentritic shaped polymer. In some embodiments, the multifunctional boronic acid crosslinking agents of the present disclosure can be water-soluble.

An exemplary structure of a dendrimeric multifunctional boronic acid crosslinking agent is shown in Formula VII, where R is an organic group.

Formula VII

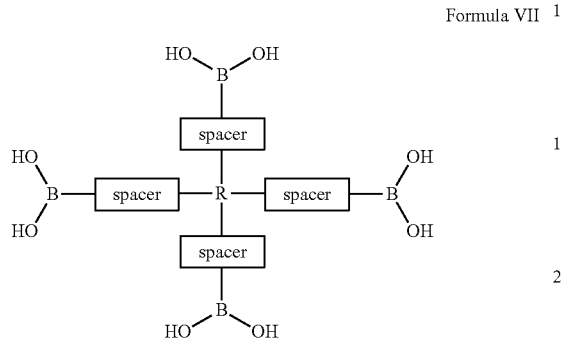

As used herein, the terms "dendritic polymers" or "dendrimers" refer to polymers which are distinguished by a branched structure. Dendrimers (e.g., cascade polymers, arborols, isotropically branched polymers, isobranched polymers, and/or starburst polymers) generally are macromolecules which are uniform at the molecular level and have a highly symmetrical structure. Dendrimers are derived structurally from the star polymers, the individual chains in turn each being branched in a star-like manner. They can form from small molecules by a constantly repeating reaction sequence, resulting in one or more branches, on the ends of which there are in each case functional groups which in turn are starting points for further branching. Thus, the number of functional terminal groups multiplies with each reaction step. A characteristic feature of the dendrimers is the number of reaction steps (generations) carried out for their synthesis. Owing to their uniform structure, dendrimers can have as a rule a defined molar mass. In some embodiments, the multifunctional boronic acid crosslinking agents of the present disclosure may be dendrimeric in nature with about 2 to about 10 generations. In another embodiment, the dendrimeric multifunctional boronic acid crosslinking agents may have about 2 to about 5 generations. In some embodiments, the dendrimeric multifunctional boronic acid crosslinking agents can generally have a molecular weight between about 1,000 Daltons and 10,000 Daltons.

As used herein, the term "star polymer" refers to polymers in which three or more chains extend from a center moiety. The center moiety can be a single atom or a group of atoms. Star polymers can be produced either by polymerization from multifunctional cores or by post modification reactions. Polymerization from a multifunctional core can be desirable for high molecular weight polymers. Star polymer synthesis by post modification reactions is well known in the art.

The dendritic or star polymeric multifunctional boronic acid crosslinking agents may comprise any suitable monomer units and/or spacer units (e.g., "R" or "spacer" in Formula VII) that result in a suitable crosslinking agent. In some embodiments, the monomer units can be water-soluble. For example, Formula VII illustrates a dendritic multifunctional boronic acid crosslinking agent with at least one generation that may have up to four boronic acid functional groups. In some embodiments with at least 2 generations, the dendritic multifunctional boronic acid crosslinking agents can have up to eight boronic acid functional groups in the outer generation. In addition to the boronic acid functional group, spacer units can comprise a polymer or oligomer synthesized from at least one water-soluble monomer unit that may include, but is not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, a quaternary salt derivative of acrylamide, a quaternary salt derivative of acrylic acid, alkyl acrylate, alkyl methacrylate, alkyl acrylamide, alkyl methacrylamide, alkyl dimethylammoniumethyl methacrylate halide, alkyl dimethylammoniumpropyl methacrylamide halide, any derivative thereof, and any combination thereof.

Suitable spacer units may also comprise any suitable linkage moieties, including, but not limited to, an amide, ester, ether, phosphate esters, amide, acetal, ketal, orthoester, carbonate, anhydride, silyl ether, alkene oxides, ether, imine, ether ester, ester amide, ester urethane, carbonate urethane, amino acids linkage, and any combination thereof. Suitable spacer units may also comprise any suitable linkage moieties, including but not limited, to an alkane, a polyethylene amine, a polyethylene oxide, a polyester, polycarbonate, polyurethane, polyphosphate esters, polyamides, polyacetals, polyketals, polyorthoesters, polyanhydrides, polysilyl ethers, polyalkene oxides), polyethers, polyimines, poly (ether esters), poly(ester amides), poly(ester urethanes), poly(carbonate urethanes), and poly(amino acids), and any combination thereof.

In addition to water-soluble monomer units and/or spacer units, one or more hydrophobic and/or hydrophilic monomer units or polymers comprising hydrophobic monomers may also be present in the interior generations of the dendrimer so long as any hydrophobic monomer units do not interfere with the function of the crosslinking agent in the treatment fluids described herein. In some embodiments, the multifunctional boronic acid crosslinking agents can have a ratio of boronic acid functional groups to monomers on the outer generation ranging from a lower limit of about 1:1, 1:10, 1:20, 1:30, 1:40, 1:50, 1:60, 1:70, 1:80, 1:90, and 1:100 to an upper limit of about 1:200, 1:190, 1:180, 1:170, 1:160, 1:150, 1:140, 1:130, 1:120, 1:110, and 1:100, encompassing any value and any subset therebetween.

In some embodiments, the multifunctional boronic acid crosslinking agents may be a difunctionalized molecule. A suitable difunctionalized molecule structure may include, but is not limited to, the structure generally represented by Formula VIII, where $R_1$ is an organic group.

Formula VIII

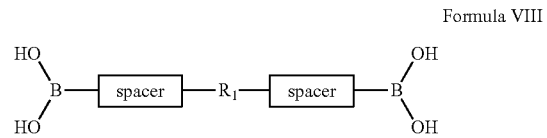

In Formula IIIV, R1 and/or the spacer(s), alone or in combination, may be a functional group, a monomer, and/or a polymer with an average molecular weight in the range of about 200 Daltons to about 2,000,000 Daltons.

The spacer(s) may be a small oligomer, a functional group, or a polymer suitable for connecting the monomer or polymer R1 to the boronic acid functional group. Suitable spacer units may comprise any suitable moieties, including, but not limited to, an amide group, an ester group, or an ether group. Suitable polymers useful as spacer units may include, but are not limited to, polyalphaolefins, polyaryletherketones, polybutenes, polyimines, polycarbonates, polyesters, aromatic polyamides, ethylene vinyl acetate polymers, polyacetals, polyethylenes, polyethylene oxides, polypropylenes, polymethylpentene, polyphenylene oxide, polystyrene, any derivative thereof, and any combination thereof. In some embodiments, the multifunctional boronic acid crosslinking agents of the general structure shown in Formula VIII may be a water-soluble polymer and may comprise any number of suitable monomer units that do not interfere with the crosslinking of the boronic acid groups with the gelling agent in the treatment fluids herein.

The multifunctional boronic acid crosslinking agents may also be a copolymer. Suitable copolymer structures may include, but are not limited to, the structure generally represented by Formula IX, where X represents a functionality bound to a monomer unit of the polymer backbone. Although Formula IX has indicated a regular spacing between boronic acid monomer units, it is to be recognized that the spacing of boronic acid monomer units can be regular in some embodiments or random in other embodiments.

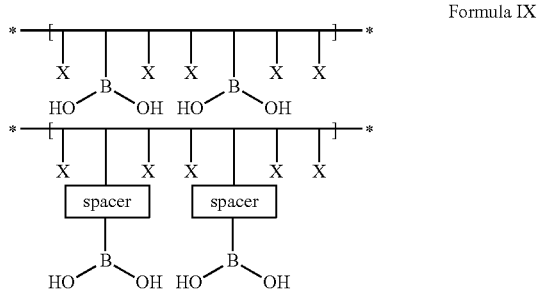

Formula IX

In some embodiments, the multifunctional boronic acid crosslinking agent may comprise a copolymer that comprises at least one boronic acid monomer unit and at least one water-soluble monomer unit. In some embodiments, the multifunctional boronic acid crosslinking agent may comprise a random copolymer of at least one boronic acid monomer unit and at least one water-soluble monomer unit. In some embodiments, the multifunctional boronic acid crosslinking agent may comprise a copolymer that is a gradient copolymer. Formula X shows a structure of an illustrative but non-limiting gradient copolymer containing monomer units A and B.

Formula X

In some embodiments, the multifunctional boronic acid crosslinking agent may comprise a copolymer that is not a gradient copolymer. An illustrative but non-limiting non-gradient copolymer may have a structure shown in Formula XI below, where A presents a monomer unit comprising a boronic acid functionality.

Formula IX

In some embodiments, the multifunctional boronic acid crosslinking agent may comprise a copolymer that has a reduced gradient copolymer character. For example, a multifunctional boronic acid crosslinking agent having a reduced gradient copolymer character might have only about 5 B monomer units on its chain termini, as compared to 15 B monomer units in Formula X.

In some embodiments, a copolymer comprising the multifunctional boronic acid crosslinking agent may comprise at least one water-soluble monomer unit. Suitable water-soluble monomer units may include, but are not limited to, an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof.

In various embodiments, a copolymer comprising the multifunctional boronic acid crosslinking agent may comprise at least one boronic acid monomer unit, particularly a boronic acid monomer unit containing a polymerizable vinyl, allyl, or acrylic functional group. In some embodiments, the at least one boronic acid monomer unit may comprise an aryl boronic acid. In other embodiments, the at least one boronic acid monomer unit may comprise an alkyl, alkenyl or alkynyl boronic acid (i.e., aliphatic boronic acids). It should be noted that the classification of a boronic acid as aryl, alkyl, alkenyl, or alkynyl refers to the point of attachment of the boronic acid group. That is, for example, an aryl boronic acid has a boronic acid or a boronate ester derivative thereof attached to an aryl ring, and an alkenyl boronic acid has a boronic acid or boronate ester derivative thereof attached to an alkenyl group. As previously noted, a boronic acid may have additional functionality elsewhere in the molecule. For example, an aryl boronic acid may have an alkenyl functionality elsewhere in the molecule that is not attached to the boronic acid functionality.

In some embodiments, the multifunctional boronic acid crosslinking agent may be a block copolymer including, but not limited to, a diblock, triblock or multiblock copolymer. An exemplary embodiment of a suitable diblock copolymer structure may include, but is not limited to, the structure generally represented by Formula XII, where m and n are integers and X represents a functionality bound to a monomer unit of the polymer backbone:

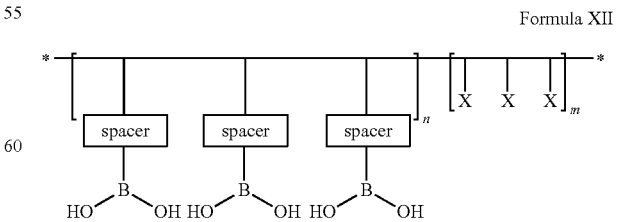

Formula XII

In various embodiments, the copolymers and block copolymers of Formulas IX through XII can have an average molecular weight between about 1,000 Daltons and about 2,000,000 Daltons. For the multifunctional boronic acid crosslinking agents having the general structures shown in Formulas IX through XII, the monomers within the polymer structure may be any suitable monomers that result in a water-soluble polymer molecule and do not interfere with the crosslinking of the boronic acid group with a gelling agent. Formulas IX and XIII illustrate that a boronic acid functional group may be directly bonded to the backbone of the polymer and/or the boronic acid functional group may be connected to the polymer backbone with an intervening spacer group.

In some embodiments, a multifunctional boronic acid crosslinking agent of the general structure shown in Formula IX, can be synthesized by polymerization of a vinyl monomer containing a boronic acid functional group (e.g., 3-acrylamidophenyl boronic acid) and any suitable water-soluble monomer containing a vinyl group including, but not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides, alkyl dimethylammoniumethyl methacrylate halides, alkyl dimethylammoniumpropyl methacrylamide halides, any derivatives thereof, and any combinations thereof. Other functional groups may also be present along the polymer backbone. In some embodiments, the boronic acid functional group may be grafted onto an already formed polymer backbone using techniques known to one having ordinary skill in the art. In some embodiments, as generally represented by Formulas IX and XII, the ratio of the boronic acid monomer units to the other monomer units in the polymer may range from about 1:1 to about 1:200.

In some embodiments, the multifunctional boronic acid crosslinking agents of the present disclosure may comprise an equilibrium species. For example, the multifunctional boronic acid crosslinking agents may become protonated or deprotonated depending on pH. This feature can influence their solubility in the treatment fluids described herein. Likewise, intramolecular interactions between atoms in the multifunctional boronic acid crosslinking agents of the present disclosure and the geometry of boron (e.g., tetrahedral or trigonal planar) can depend on pH and/or solvent (e.g., an alcohol-based solvent such as methanol). Thus, the exact chemical composition and geometry of the multifunctional boronic acid crosslinking agents of the present disclosure may depend on a particular equilibrium known to one of ordinary skill in the art. The geometry may also depend on the neighboring group participation in changing the steoreochemistry. For example, a nitrogen atom present in a neighboring group may share its lone pair of electrons with a boron to result in a tetrahedral geometry, which may allow for the formation of a bond to hydroxyl groups at a relatively neutral pH.

In some embodiments, a multifunctional boronic acid crosslinking agent may be prepared by incorporation of one or more of the monomer units listed above in the polymer synthesis with a boronic acid monomer unit. Formula XIII illustrates an embodiment of the present disclosure, where x and y are integers and R is a hydrogen or an alkyl, alkenyl, alkynyl, aryl, heteroaryl, or cycloalkyl group. For example, a multifunctional boronic acid crosslinking agent according to Formula XIII may be prepared by copolymerizing 3-acrylamidophenylboronic acid with an acrylamide monomer unit (e.g., N,N-dimethylacrylamide) in the ratio of about 1:1 to about 1:200 (e.g., a ratio of x:y ranging from about 1:1 to about 1:200) by free radical polymerization to provide the multifunctional boronic acid crosslinking agent.

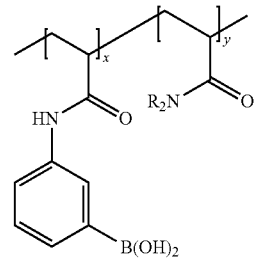

Formula XIII

In another illustrative embodiment, a multifunctional boronic acid crosslinking agent can be prepared by copolymerizing 4-vinylphenylboronic acid and acrylamide. Such a copolymer has a structure represented by Formula XIV.

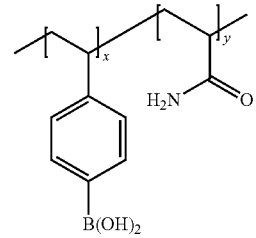

Formula XIV

In some embodiments, the 4-vinylphenylboronic acid may be protected as a boronate ester such as, for example, a polyol boronate ester. Such a copolymer has a structure represented by Formula XV. It should be understood that any vicinal hydroxyl groups in the polyol can react with the boronic acid, and the indicated structure in Formula XV should be considered illustrative in that regard. That is, other isomers can be formed. In both Formulas XIV and XV, x and y are integers. As previously noted, the solubilizing groups (e.g., the polyol) may be removed at some point after the synthesis of the copolymer to liberate the free boronic acid groups for crosslinking.

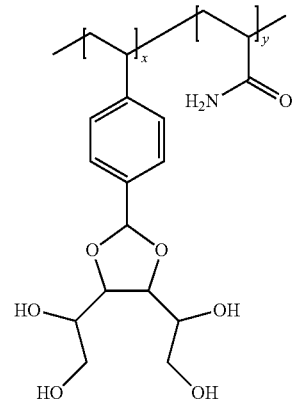

Formula XV

In yet another illustrative embodiment, the multifunctional boronic acid crosslinking agent can comprise a compound represented by Formula XVI, where x and y are integers and R is a hydrogen or an alkyl, alkenyl, alkynyl, aryl, heteroaryl, or cycloalkyl group. In this embodiment, the multifunctional boronic acid crosslinking agent may be prepared by copolymerizing 2-((2-acrylamidoethylamino) methyl)phenylboronic acid and an acrylamide in the ratio of about 1:1 to about 1:200 (e.g., a ratio of x:y ranging from about 1:1 to about 1:200 in Formula X) by free radical polymerization.

Formula XVI

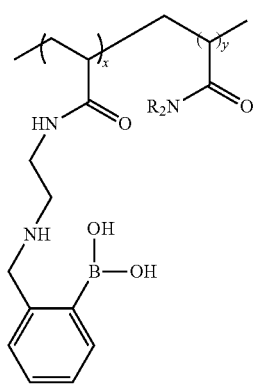

In still another illustrative embodiment, the multifunctional boronic acid crosslinking agent may be a difunctional boronic crosslinking agent having Formula XVII, where u is an integer and R comprises a carbon, nitrogen, oxygen or sulfur atom. For example, when R is O or NH, the difunctional boronic acid crosslinking agent of Formula XVI may be prepared by reacting two equivalents of 2-formylphenylboronic acid with one equivalent of oligomeric ethylene oxide or oligomeric ethylenediamine followed by reduction of the intermediate imine. In an embodiment, the reduction of the intermediate imine may be conducted using reductive amination techniques that are known to one having ordinary skill in the art, The crosslinking agents of the present disclosure may be provided or used in any suitable form. For instance, the crosslinking agents can be a liquid, a gel, an emulsion, a powder (e.g., a fine powder), or a solid. The form of the crosslinking agent may depend on the specific choice of the material for forming the crosslinking agent, the type of stabilizing agent selected, the type of treatment operation, and the like.

In certain embodiments of the present disclosure, the crosslinking agent may be formulated to remain inactive until it is "activated" by, among other things, certain conditions in the fluid (e.g., pH, temperature, etc.) and/or interaction with some other substance. For example, in some embodiments, the crosslinking agent may be selected to react immediately upon encountering the gelling agent. In other embodiments, however, the crosslinking agent may be delayed, such that the reaction between the gelling agent and the crosslinking agent does not occur until sometime after both the gelling agent and the crosslinking agent have come into contact. For example, the delayed crosslinking reaction may be desired only when the treatment fluid is under static or near-static conditions (e.g., once in a fracture). In other embodiments, a combination of a delayed crosslinking agent and an immediate reaction crosslinking agent may be used.

In some embodiments, the delayed crosslinking agent may be preferred when the crosslinker-coated particulates are pre-coated and included in the treatment fluid comprising the gelling agent under static conditions. One of ordinary skill in the art, with the benefit of this disclosure will recognize whether to include a crosslinking agent that will immediately react with the gelling agent in the treatment fluid or will result in a delayed reaction. Factors affecting the speed of the crosslinking reaction may include, but are not limited to, the crosslinking agent selected, the gelling agent selected, the conditions of the treatment fluid (e.g., pH, temperature, salinity, and the like), the conditions of the subterranean formation being treated (e.g., shear, pH, temperature, and the like), and the like.

In some embodiments, the crosslinking reaction between the gelling agent and the crosslinking agent on the crosslinker-coated particulates may be facilitated by including a removable partitioning agent at least partially coated atop the crosslinking agent, which is itself at least partially coated atop the stabilizing agent. The removable partitioning agent may further provide ease of transport of the crosslinker-coated particulates, which may be stored in a dry state or concentrated in a fluid that does not react with the removable partitioning agent coated crosslinker-coated particulates, which may be, in some cases, directly diluted into the treatment fluids described herein, without departing from the scope of the present disclosure. Such fluids may be solvent-based fluids, for example, an organic hydrocarbon solvent, such as a diesel, a paraffinic solvent, combinations thereof, and the like. The removable partitioning agent may be removed or otherwise dissolved in the treatment fluid upon exposure to certain activators. Generally, the removable partitioning agent in the embodiments herein may be removed by exposure to the treatment fluid under downhole conditions. In some embodiments, the removable partitioning agent may comprise any material capable of dissipating in the presence of the aqueous base fluid included in the treatment fluids described herein.

Suitable materials for forming the removable partitioning agents of the present disclosure may include those that generally quickly dissipate in the presence of the aqueous base fluids described herein or those that generally have slower dissipation times. In some embodiments, a combination of the two types of removable partitioning agents may be desirable. Suitable quick dissipating removable partitioning agents may include, but are not limited to, a salt, a barium sulfate, a benzoic acid, a polyvinyl alcohol, a sodium carbonate, a sodium bicarbonate, and any combination thereof. Suitable slower dissipating removable partitioning agents may include, but are not limited to a calcium oxide, a hydratable polymer, and any combination thereof. Examples of suitable hydratable polymers for use in forming the removable partitioning agents of the present disclosure may include, but are not limited to, a polysaccharide, a chitin, a chitosan, a cellulose, a cellulose derivative, a protein, an aliphatic polyester, a poly(lactide), a poly(glycolide), a poly(ε-caprolactone), a poly(hydroxybutyrate), a poly(anhydride), an aliphatic polycarbonate, a poly(orthoester), a poly(amino acid), a poly(ethylene oxide), a poly (phosphazene), a corn starch, a wheat starch, a potato starch, a barley starch, a bean starch, a cassava starch, a ground rice, a ground corn, a ground wheat, a ground bean, a ground guar gum, a polyacrylate, a polymethacrylate, a polyacrylamide, a polyvinylpyrrolidone, and any combination thereof.

In some embodiments, the removable partitioning agent may be included to at least partially coat the crosslinker-coated particulates of the present disclosure. In other embodiments, the removable partitioning agent may be included to substantially coat the crosslinker-coated particulates described herein. In preferred embodiments, the removable partitioning agent may be included such that it coats from a lower limit of about 1%, 10%, 20%, 30%, 40%, and 50% to an upper limit of about 100%, 90%, 80%, 70%, 60%, and 50% of the surface of the crosslinker-coated particulates. One of skill in the art, with the benefit of this disclosure, will recognize the amount of coating of the removable partitioning agent based on a number of factors including, but not limited to, the amount of delay desired before reacting the gelling agent and the crosslinking agent, the amount of crosslinking agent on the crosslinker-coated particulates, the amount of gelling agent included in the treatment fluid, the conditions of the treatment fluid and the subterranean formation, and the like.

The treatment fluids described in the embodiments of the present disclosure may comprise an aqueous base fluid and a gelling agent. Any aqueous base fluid suitable for use in a subterranean formation operation may be used in the embodiments of the present disclosure. Examples of suitable aqueous base fluids may include, but are not limited to, fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the treatment fluids or components of the treatment fluids disclosed herein.

The gelling agents suitable for use in the embodiments of the present disclosure may comprise any substance (e.g., a polymeric material) capable of reacting with the crosslinking agents of the crosslinker-coated particulates so as to suspend the crosslinker-coated particulates. The gelling agents may be naturally-occurring gelling agents, synthetic gelling agents, and any combination thereof. Suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combination thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized di methylaminoethylmethacrylate, derivatives thereof, and any combination thereof. In certain embodiments, the gelling agent may comprise an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids useful in the methods of the embodiments of the present disclosure in an amount sufficient to provide the desired reaction with and suspension of the crosslinker-coated particulates. In some embodiments, the gelling agents may be present in an amount in the range of from a lower limit of about 0.01%, 0.025%, 0.05%, 0.075%, 0.1%, 0.25%, 0.5%, 0.75%, 1%, 1.25%, 1.5%, 1.75%, and 2% to an upper limit of about 5%, 4.75%, 4.5%, 4.25%, 4%, 3.75%, 3.5%, 3.25%, 3%, 2.75%, 2.5%, 2.25%, and 2% by weight of the treatment fluid, encompassing any value and subset therebetween. Generally, for a given operation, the gelling agent may be present in an amount of about 30% to about 50% less than the amount of gelling agent required in an operation that does not employ the crosslinker-coated particulates described herein.

In some embodiments, the treatment fluids of the present disclosure may further comprise a breaker. In some embodiments, the crosslinking agent may react with the gelling agent and then disassociate from the crosslinker-coated particulate, as described above, thereby leaving the particulate at least partially coated with the stabilizing agent, the stabilizing agent imparting a hydrophobic nature to the particulate. The breaker in the treatment fluid, which may be an immediate breaker or a delayed breaker, may break the crosslinked gelling agent in the treatment fluid and hydrophobic nature of the stabilizing agent remaining on the particulate may prevent interaction of the particulate and the broken treatment fluid. Advantageously, because the methods described herein allow for a reduced amount of gelling agent and crosslinking agent to be used to achieve suspension of particulates, as compared to traditional operations, a reduced amount of breaker may also be utilized, further translating into cost savings for operators.

The breakers for use in the treatment fluids described herein may include, but are not limited to, enzyme, oxidizing, acid buffer, delayed breakers, and any combination thereof. The breakers may cause the treatment fluids of the embodiments of the present disclosure to revert to thin fluids that can be produced back to the surface, for example. In some embodiments, the breaker may be formulated to remain inactive until it is "activated" by, among other things, certain conditions in the fluid (e.g., pH, temperature, etc.) and/or interaction with some other substance. In some embodiments, the breaker may be delayed by encapsulation with a coating (e.g., a porous coatings through which the breaker may diffuse slowly, or a degradable coating that degrades downhole) that delays the release of the breaker. In other embodiments the breaker may be a degradable material (e.g., polylactic acid or polygylcolic acid) that releases an acid or alcohol in the present of an aqueous liquid.

Specific examples of suitable breakers may include, but are not limited to, sodium chlorites, hypochlorites, perborate, persulfates, and peroxides (including organic peroxides). Other suitable breakers may include, but are not limited to, suitable acids and peroxide breakers, delinkers, as well as enzymes that may be effective in breaking the treatment fluids described herein. The breaker may be citric acid, tetrasodium EDTA, ammonium persulfate, or cellulose enzymes. Combinations of these may also be suitable.

In certain embodiments, the breaker used may be present in the treatment fluids in an amount in the range of from a lower limit of about 0.0001%, 0.001%, 0.01%, 0.1%, 1%, 10%, 20%, 30%, 40%, 50%, 60%, 70%, and 80% to an upper limit of about 200%, 190%, 180%, 170%, 160%, 150%, 140%, 130%, 120%, 110%, 100%, 90%, and 80% by weight of the gelling agent. One of ordinary skill in the art, with the benefit of this disclosure, will recognize the type and amount of breaker to include in certain treatment fluids of the embodiments of the present disclosure based on, among other factors, the desired amount of delay time before the treatment fluid (i.e., the crosslinked gelling agent) breaks, the type of gelling agents used, the temperature conditions of a particular application, and/or the pH of the treatment fluid.

In some embodiments, the treatment fluids may further comprise an additive selected from the group consisting of a salt, an emulsifier, a dispersion aid, a corrosion inhibitor, a surfactant, a foaming agent, a gas, a pH control additive, a breaker, a biocide, a chelating agent, a scale inhibitor, a gas hydrate inhibitor, a friction reducer, a clay stabilizing agent, and any combination thereof.

In some embodiments, the buffer may be selected so as to control the rate of a breaker in the treatment fluid or to ensure that the various other components of the treatment fluids described herein (e.g., crosslinker-coated particulates) operate properly and/or at a particular time during an operation. In general, the pH of the treatment fluids of the present disclosure are preferably in the range of from a lower limit of about 2, 3, 4, 5, 6, 7, and 8 to an upper limit of about 14, 13, 12, 11, 10, 9, and 8. Any buffer suitable for use in a subterranean formation operations and suitable for achieving the desired pH value or range of a particulate treatment fluid may be suitable for use in the embodiments described herein. Examples of suitable buffers may include, but are not limited to, sodium acetate, acetic acid, ammonium acetate, sodium carbonate, potassium carbonate, sodium bicarbonate, potassium bicarbonate, sodium diacetate, potassium diacetate, sodium phosphate, potassium phosphate, sodium hydrogen phosphate, potassium hydrogen phosphate, sodium dihydrogen phosphate, potassium dihydrogen phosphate, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering treatment fluids described herein, one or more portions of the treatment fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: preparing a treatment fluid comprising an aqueous base fluid, a gelling agent, and crosslinker-coated particulates, wherein the crosslinker-coated particulates are formed by at least partially coating a particulate with a stabilizing agent, and at least partially coating the particulate with a first crosslinking agent atop the stabilizing agent, wherein the stabilizing agent imparts a hydrophobic nature to the particulate when the stabilizing agent is at least partially coated onto the particulate; introducing the treatment fluid into a subterranean formation, and reacting the first crosslinking agent with the gelling agent in the treatment fluid so as to crosslink the gelling agent and suspend the crosslinker-coated particulates B. A method comprising: preparing a treatment fluid comprising an aqueous base fluid, a gelling agent, and crosslinker-coated particulates, wherein the crosslinker-coated particulates are formed by at least partially coating a particulate with a stabilizing agent, at least partially coating the particulate with a first crosslinking agent atop the stabilizing agent, and at least partially coating the particulate with a removable partitioning agent atop the first crosslinking agent, wherein the stabilizing agent imparts a hydrophobic nature to the particulates when the stabilizing agent is at least partially coated onto the particulate; introducing the treatment fluid into a subterranean formation; removing the removable partitioning agent; and reacting the first crosslinking agent with the gelling agent in the treatment fluid so as to crosslink the gelling agent and suspend the crosslinker-coated particulates.

C: A system comprising: a wellhead with a tubular extending therefrom and into a subterranean formation, and a pump fluidly coupled to the tubular, the tubular containing a treatment fluid that comprises an aqueous base fluid, a gelling agent, and crosslinker-coated particulates, wherein the crosslinker-coated particulates are formed by at least partially coating a particulate with a stabilizing agent, and at least partially coating the particulate with a first crosslinking agent atop the stabilizing agent, and wherein the stabilizing agent imparts a hydrophobic nature to the particulate when the stabilizing agent is at least partially coated onto the particulate.

Each of embodiments A, B, and C may have one or more of the following additional elements in any combination:

Element 1: Wherein the subterranean formation comprises at least one fracture and the crosslinker-coated particulates are placed within the at least one fracture to form a proppant pack therein.

Element 2: Wherein the step of: reacting the first crosslinking agent with the gelling agent in the treatment fluid so as to crosslink the gelling agent, further comprises dissociating the first crosslinking agent from the particulate, thereby leaving the particulate at least partially coated with the stabilizing agent, the stabilizing agent imparting the hydrophobic nature to the particulate.

Element 3: Wherein the treatment fluid further comprises a breaker and wherein after the step of: dissociating the first crosslinking agent from the particulate, thereby leaving the particulate at least partially coated with the stabilizing agent, the stabilizing agent imparting the hydrophobic nature to the particulate, the crosslinked gelling agent in the treatment fluid is broken and the hydrophobic nature of the particulate prevents the broken treatment fluid from substantially interacting with the particulate at least partially coated with the stabilizing agent.

Element 4: Wherein the gelling agent is selected from the group consisting of naturally-occurring gelling agents, synthetic gelling agents, and any combination thereof.

Element 5: Wherein the stabilizing agent is selected from the group consisting of a non-aqueous tackifying agent, an aqueous tackifying agents, an emulsified tackifying agent, a silyl-modified polyamide compound, a resin, a polymerizable organic monomer composition, a consolidating agent emulsion, a zeta-potential modifying aggregating compositions, a silicon-based resins, a binder, and any combination thereof.

Element 6: Wherein the first crosslinking agent is selected from the group consisting of a metal crosslinking agent, a polymeric crosslinking agent, and any combination thereof.

Element 7: Wherein at least a second crosslinking agent is further included in the treatment fluid in a form that is not coated onto the particulate.

Element 8: Wherein stabilizing agent and the first crosslinking agent is coated onto the particulates by at least one of dry coating, wet coating, and any combination thereof.

Element 9: Wherein the treatment fluid further comprises an additive selected from the group consisting of a salt, an emulsifier, a dispersion aid, a corrosion inhibitor, a surfactant, a foaming agent, a gas, a pH control additive, a breaker, a biocide, a chelating agent, a scale inhibitor, a gas hydrate inhibitor, a friction reducer, a clay stabilizing agent, and any combination thereof.

Element 10: Wherein the treatment fluid is introduced into the subterranean formation using at least one of a high pressure pump and a low pressure pump.

Element 11: Wherein the removable partitioning agent comprises material that dissipates in the presence of the aqueous base fluid.

Element 12: Wherein the removable partitioning agent is selected from the group consisting of a salt, a barium sulfate, a benzoic acid, a polyvinyl alcohol, a sodium carbonate, a sodium bicarbonate, a calcium oxide, a hydratable polymer, and any combination thereof.

By way of non-limiting example, exemplary combinations applicable to A and B include: A with 1, 2, and 3; A with 6 and 7; B with 4; B with 8; B with 9 and 10; C with 4 and 5; C with 8 and 9.

To facilitate a better understanding of the embodiments of the present disclosure, the following examples of preferred or representative embodiments are given. In no way should the following examples be read to limit, or to define, the scope of the disclosure.

EXAMPLE 1

In this example, the suspension ability of the crosslinker-coated particulates in the treatment fluids described herein was evaluated. The crosslinker-coated particulates were formed by dry coating 4 pounds per gallon ("lb/gal") of 20/40 sand particulates (47.9 grams) with 0.47 milliliters ("mL") of a polyamide stabilizing agent. Thereafter, the sand particulates were dry coated with 2 gallons per 1000 gallons of a borate crosslinking agent, capable of instant crosslinking. The crosslinker-coated particulates were then suspended in a treatment fluid comprising a water aqueous base fluid and 30 pounds per 1000 gallons of guar gum gelling agent. The treatment fluid was visually observed to determine the suspension of the crosslinker-coated particulates.

At time=0, the 4 lb/gal of crosslinker-coated particulates were suspended and remained so after the elapse of about 2 hours, at which point slight settling was observed. Full settling of the crosslinker-coated particulates was not observed until after the elapse of 15 hours. These results indicated that the crosslinker-coated particulates are cable of remaining in suspension for time periods suitable for use in subterranean formation operations using reduced amounts of crosslinking agent and gelling agent than are traditionally required.

EXAMPLE 2

In this example, the suspension ability of the crosslinker-coated particulates in the treatment fluids described herein was evaluated. The crosslinker-coated particulates were formed by wet coating 4 pounds per gallon ("lb/gal") of 20/40 sand particulates (47.9 grams) with 0.47 milliliters ("mL") of a polyamide stabilizing agent. Thereafter, the sand particulates were dry coated with 2 gallons per 1000 gallons of a borate crosslinking agent, capable of instant crosslinking. The crosslinker-coated particulates were then suspended in a treatment fluid comprising a water aqueous base fluid and 15 pounds per 1000 gallons of guar gum gelling agent. The treatment fluid was visually observed to determine the suspension of the crosslinker-coated particulates.

At time=0, the 4 lb/gal of crosslinker-coated particulates were suspended and remained so after the elapse of about 15 minutes, at which point settling was observed. The settling rate of the 4 lb/gal of crosslinker-coated particulates in the 15 pounds per 1000 gallons was, as expected, at a faster rate, however, in traditional operations having the same amount of crosslinking agent and gelling agent in a treatment fluid, particulates have been observed to settle almost immediately. These results indicated that the crosslinker-coated particulates are cable of remaining in suspension for at least a duration of time using reduced amounts of crosslinking agent and gelling agent than are traditionally required.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
preparing a treatment fluid comprising an aqueous base fluid, a gelling agent, and crosslinker-coated particulates,
wherein the crosslinker-coated particulates are formed by at least partially coating a particulates with a stabilizing agent, and at least partially coating the particulate with a first crosslinking agent atop the stabilizing agent,
wherein the stabilizing agent imparts a hydrophobic nature to the particulate when the stabilizing agent is at least partially coated onto the particulate;
introducing the treatment fluid into a subterranean formation;
reacting the first crosslinking agent with the gelling agent in the treatment fluid so as to crosslink the gelling agent and suspend the crosslinker-coated particulates; and
dissociating the first crosslinking agent from the particulate, thereby leaving the particulate at least partially coated with the stabilizing agent, the stabilizing agent imparting the hydrophobic nature to the particulate.

2. The method of claim 1, wherein the subterranean formation comprises at least one fracture and the crosslinker-coated particulates are placed within the at least one fracture to form a proppant pack therein.

3. The method of claim 1, wherein the treatment fluid further comprises a breaker and wherein after the step of: dissociating the first crosslinking agent from the particulate, thereby leaving the particulate at least partially coated with the stabilizing agent, the stabilizing agent imparting the hydrophobic nature to the particulate,
the crosslinked gelling agent in the treatment fluid is broken and the hydrophobic nature of the particulate prevents the broken treatment fluid from substantially interacting with the particulate at least partially coated with the stabilizing agent.

4. The method of claim 1, wherein the gelling agent is selected from the group consisting of naturally-occurring gelling agents, synthetic gelling agents, and any combination thereof.

5. The method of claim 1, wherein the stabilizing agent is selected from the group consisting of a non-aqueous tackifying agent, an aqueous tackifying agents, an emulsified tackifying agent, a silyl-modified polyamide compound, a resin, a polymerizable organic monomer composition, a consolidating agent emulsion, a zeta-potential modifying aggregating compositions, a silicon-based resins, a binder, and any combination thereof.

6. The method of claim 1, wherein the first crosslinking agent is selected from the group consisting of a metal crosslinking agent, a polymeric crosslinking agent, and any combination thereof.

7. The method of claim 1, wherein at least a second crosslinking agent is further included in the treatment fluid in a form that is not coated onto the particulate.

8. The method of claim 1, wherein stabilizing agent and the first crosslinking agent is coated onto the particulates by at least one of dry coating, wet coating, and any combination thereof.

9. The method of claim 1, wherein the treatment fluid further comprises an additive selected from the group consisting of a salt, an emulsifier, a dispersion aid, a corrosion inhibitor, a surfactant, a foaming agent, a gas, a pH control additive, a breaker, a biocide, a chelating agent, a scale inhibitor, a gas hydrate inhibitor, a friction reducer, a clay stabilizing agent, and any combination thereof.

10. A method comprising:
preparing a treatment fluid comprising an aqueous base fluid, a gelling agent, and crosslinker-coated particulates,
wherein the crosslinker-coated particulates are formed by at least partially coating a particulate with a stabilizing agent, at least partially coating the particulate with a first crosslinking agent atop the stabilizing agent, and at least partially coating the particulate with a removable partitioning agent atop the first crosslinking agent,
wherein the stabilizing agent imparts a hydrophobic nature to the particulates when the stabilizing agent is at least partially coated onto the particulate;
introducing the treatment fluid into a subterranean formation;
removing the removable partitioning agent;
reacting the first crosslinking agent with the gelling agent in the treatment fluid so as to crosslink the gelling agent and suspend the crosslinker-coated particulates; and
dissociating the first crosslinking agent from the particulate, thereby leaving the particulate at least partially coated with the stabilizing agent, the stabilizing agent imparting the hydrophobic nature to the particulate.

11. The method of claim 10, wherein the subterranean formation comprises at least one fracture and the crosslinker-coated particulates are placed within the at least one fracture to form a proppant pack therein.

12. The method of claim 10, wherein the treatment fluid further comprises a breaker and wherein after the step of: dissociating the first crosslinking agent from the particulate, thereby leaving the particulate at least partially coated with the stabilizing agent, the stabilizing agent imparting the hydrophobic nature to the particulate,
the crosslinked gelling agent in the treatment fluid is broken and the hydrophobic nature of the particulate prevents the broken treatment fluid from substantially interacting with the particulate at least partially coated with the stabilizing agent.

13. The method of claim 10, wherein the stabilizing agent is selected from the group consisting of a non-aqueous tackifying agent, an aqueous tackifying agents, an emulsified tackifying agent, a silyl-modified polyamide compound, a resin, a polymerizable organic monomer composition, a consolidating agent emulsion, a zeta-potential modifying aggregating compositions, a silicon-based resins, a binder, and any combination thereof.

14. The method of claim 10, wherein the first crosslinking agent is selected from the group consisting of a metal crosslinking agent, a polymeric crosslinking agent, and any combination thereof.

15. The method of claim 10, wherein the removable partitioning agent comprises material that dissipates in the presence of the aqueous base fluid.

16. The method of claim 10, wherein the removable partitioning agent is selected from the group consisting of a salt, a barium sulfate, a benzoic acid, a polyvinyl alcohol, a sodium carbonate, a sodium bicarbonate, a calcium oxide, a hydratable polymer, and any combination thereof.

17. The method of claim 10, wherein at least a second crosslinking agent is further included in the treatment fluid in a form that is not coated onto the particulates.

18. A system comprising:
a wellhead with a tubular extending therefrom and into a subterranean formation; and
a pump fluidly coupled to the tubular, the tubular containing a treatment fluid that comprises an aqueous base fluid, a gelling agent, and crosslinker-coated particulates,
wherein the crosslinker-coated particulates are formed by at least partially coating a particulate with a stabilizing agent, at least partially coating the particulate with a first crosslinking agent atop the stabilizing agent, and at least partially coating the particulate with a removable partitioning agent atop the first cross-linking agent,
wherein the stabilizing agent imparts a hydrophobic nature to the particulate when the stabilizing agent is at least partially coated onto the particulate.

* * * * *